US 12,493,996 B2

United States Patent
Ross et al.

(10) Patent No.: US 12,493,996 B2
(45) Date of Patent: Dec. 9, 2025

(54) INDICATION OF THE COUPLE PAIR OF REMOTE CONTROLS WITH REMOTE DEVICES FUNCTIONS

(71) Applicant: Cilag GmbH International, Zug (CH)

(72) Inventors: Nicholas J. Ross, Franklin, OH (US); Matthew D. Cowperthwait, Cincinnati, OH (US); Grace E. Brooks, Cincinnati, OH (US); Shane R. Adams, Lebanon, OH (US); Joshua P. Morgan, Loveland, OH (US); Taylor W. Aronhalt, Loveland, OH (US); Leonardo N. Rossoni, Rahway, NJ (US); Cory G. Kimball, Hamilton, OH (US); Monica L. Z. Rivard, Cincinnati, OH (US); Frederick E. Shelton, IV, Hillsboro, OH (US); Jacqueline C. Aronhalt, Loveland, OH (US); Kevin M. Fiebig, Cincinnati, OH (US); Risto Kojcev, Santa Clara, CA (US); Felix J. Bork, Schnürpflingen (DE)

(73) Assignee: Cilag GmbH International, Zug (CH)

( * ) Notice: Subject to any disclaimer, the term of this patent is extended or adjusted under 35 U.S.C. 154(b) by 527 days.

(21) Appl. No.: 17/688,641

(22) Filed: Mar. 7, 2022

(65) Prior Publication Data

US 2022/0338049 A1   Oct. 20, 2022

Related U.S. Application Data

(60) Provisional application No. 63/284,326, filed on Nov. 30, 2021, provisional application No. 63/174,674, filed on Apr. 14, 2021.

(51) Int. Cl.
*G06T 11/00* (2006.01)
*A61B 34/00* (2016.01)
(Continued)

(52) U.S. Cl.
CPC .............. *G06T 11/00* (2013.01); *A61B 34/20* (2016.02); *A61B 34/25* (2016.02); *A61B 34/30* (2016.02);
(Continued)

(58) Field of Classification Search
CPC ......... G06T 11/00; G06T 7/0012; G06T 7/20; G06T 19/006; G06T 2207/10028;
(Continued)

(56) References Cited

U.S. PATENT DOCUMENTS 4,171,700 A   10/1979   Farir
4,849,752 A    7/1989   Bryant
(Continued)

FOREIGN PATENT DOCUMENTS

CA   3003058 A1   5/2017
EP   0408160 A1   1/1991
(Continued)

OTHER PUBLICATIONS

"ATM-MPLS Network Interworking Version 2.0, af-aic-0178.001" ATM Standard, The ATM Forum Technical Committee, published Aug. 2003.
(Continued)

*Primary Examiner* — Eugene Yun
(74) *Attorney, Agent, or Firm* — Condo Roccia Koptiw LLP

(57) ABSTRACT

A method of assessing inter-device communication pairing in a surgical setting, may include transmitting, by a first intelligent medical device, wireless communication data within the surgical setting, receiving, by a second intelligent medical device, the wireless communication data from the first intelligent medical device, determining, by the second intelligent medical device, communication pairing data indicative of an inter-device communication pairing of the
(Continued)

second intelligent medical device with the first intelligent medical device, transmitting, by the second intelligent medical device, the communication pairing data to a modular control tower, and displaying, by the modular control tower on a display device, an augmented reality display comprising one or more virtual objects indicative of the inter-device communication pairing. An interactive surgical system may include multiple intelligent medical devices and displays which can form communication pairs in this manner.

21 Claims, 15 Drawing Sheets

(51) Int. Cl.

| | | |
|---|---|---|
| *A61B 34/20* | (2016.01) | |
| *A61B 34/30* | (2016.01) | |
| *A61B 34/32* | (2016.01) | |
| *A61B 90/00* | (2016.01) | |
| *G06F 3/14* | (2006.01) | |
| *G06F 3/147* | (2006.01) | |
| *G06T 7/00* | (2017.01) | |
| *G06T 7/20* | (2017.01) | |
| *G06T 19/00* | (2011.01) | |
| *G06V 20/20* | (2022.01) | |
| *G08B 21/18* | (2006.01) | |
| *G16H 20/40* | (2018.01) | |
| *G16H 40/67* | (2018.01) | |
| *H04L 9/40* | (2022.01) | |
| *H04L 67/12* | (2022.01) | |
| *H04W 24/10* | (2009.01) | |
| *H04W 76/14* | (2018.01) | |
| *A61B 34/10* | (2016.01) | |

(52) U.S. Cl.
CPC ............. *A61B 34/32* (2016.02); *A61B 34/76* (2016.02); *A61B 90/36* (2016.02); *A61B 90/361* (2016.02); *A61B 90/37* (2016.02); *A61B 90/39* (2016.02); *G06F 3/14* (2013.01); *G06F 3/1454* (2013.01); *G06F 3/147* (2013.01); *G06T 7/0012* (2013.01); *G06T 7/20* (2013.01); *G06T 19/006* (2013.01); *G06V 20/20* (2022.01); *G08B 21/182* (2013.01); *G16H 20/40* (2018.01); *G16H 40/67* (2018.01); *H04L 63/105* (2013.01); *H04L 67/12* (2013.01); *H04W 24/10* (2013.01); *H04W 76/14* (2018.02); *A61B 2034/102* (2016.02); *A61B 2034/2055* (2016.02); *A61B 2034/2072* (2016.02); *A61B 2090/365* (2016.02); *A61B 2090/368* (2016.02); *A61B 2090/371* (2016.02); *A61B 2090/372* (2016.02); *A61B 2090/373* (2016.02); *A61B 2090/3937* (2016.02); *A61B 2090/3975* (2016.02); *G06T 2207/10028* (2013.01); *G06T 2207/30024* (2013.01); *G06T 2210/41* (2013.01)

(58) Field of Classification Search
CPC ..... G06T 2210/41; A61B 34/20; A61B 34/25; A61B 34/30; A61B 34/32; A61B 34/76; A61B 90/36; A61B 90/361; A61B 90/37; A61B 90/39; A61B 2017/00017; A61B 90/30; G06F 3/14; G06F 3/1454; G06F 3/147; G16H 40/60; G16H 30/40
USPC ...................................................... 455/41.2
See application file for complete search history.

(56) References Cited

U.S. PATENT DOCUMENTS

| | | |
|---|---|---|
| D303,787 S | 10/1989 | Messenger et al. |
| D327,061 S | 6/1992 | Soren et al. |
| 5,189,277 A | 2/1993 | Boisvert et al. |
| 5,204,669 A | 4/1993 | Dorfe et al. |
| 5,318,563 A | 6/1994 | Malis et al. |
| 5,325,270 A | 6/1994 | Wenger et al. |
| 5,425,375 A | 6/1995 | Chin et al. |
| D379,346 S | 5/1997 | Mieki |
| 5,690,504 A | 11/1997 | Scanlan et al. |
| 5,693,042 A | 12/1997 | Boiarski et al. |
| 5,724,468 A | 3/1998 | Leone et al. |
| 6,049,467 A | 4/2000 | Tamarkin et al. |
| 6,055,458 A | 4/2000 | Cochran et al. |
| D431,811 S | 10/2000 | Nishio et al. |
| 6,179,136 B1 | 1/2001 | Kluge et al. |
| 6,269,411 B1 | 7/2001 | Reasoner |
| 6,288,606 B1 | 9/2001 | Ekman et al. |
| 6,416,471 B1 | 7/2002 | Kumar et al. |
| 6,501,485 B1 | 12/2002 | Dash et al. |
| 6,546,270 B1 | 4/2003 | Goldin et al. |
| 6,584,358 B2 | 6/2003 | Carter et al. |
| 6,611,793 B1 | 8/2003 | Burnside et al. |
| 6,731,514 B2 | 5/2004 | Evans |
| 6,760,218 B2 | 7/2004 | Fan |
| 6,839,238 B2 | 1/2005 | Derr et al. |
| 6,843,657 B2 | 1/2005 | Driscoll et al. |
| 6,913,471 B2 | 7/2005 | Smith |
| 7,009,511 B2 | 3/2006 | Mazar et al. |
| 7,044,949 B2 | 5/2006 | Orszulak et al. |
| 7,074,205 B1 | 7/2006 | Duffy et al. |
| 7,134,994 B2 | 11/2006 | Alpert et al. |
| 7,171,784 B2 | 2/2007 | Eenigenburg |
| 7,217,269 B2 | 5/2007 | El-Galley et al. |
| 7,252,664 B2 | 8/2007 | Nasab et al. |
| 7,331,699 B2 | 2/2008 | Gawalkiewicz et al. |
| 7,344,532 B2 | 3/2008 | Goble et al. |
| 7,353,068 B2 | 4/2008 | Tanaka et al. |
| 7,408,439 B2 | 8/2008 | Wang et al. |
| D579,876 S | 11/2008 | Novotney et al. |
| D583,328 S | 12/2008 | Chiang |
| 7,496,418 B2 | 2/2009 | Kim et al. |
| D589,447 S | 3/2009 | Sasada et al. |
| 7,500,747 B2 | 3/2009 | Howell et al. |
| 7,518,502 B2 | 4/2009 | Austin et al. |
| 7,563,259 B2 | 7/2009 | Takahashi |
| 7,601,149 B2 | 10/2009 | DiCarlo et al. |
| 7,637,907 B2 | 12/2009 | Blaha |
| 7,656,671 B2 | 2/2010 | Liu et al. |
| 7,757,028 B2 | 7/2010 | Druke et al. |
| D631,252 S | 1/2011 | Leslie |
| 7,932,826 B2 | 4/2011 | Fritchie et al. |
| 7,945,065 B2 | 5/2011 | Menzl et al. |
| 7,945,342 B2 | 5/2011 | Tsai et al. |
| 7,982,776 B2 | 7/2011 | Dunki-Jacobs et al. |
| 7,995,045 B2 | 8/2011 | Dunki-Jacobs |
| 8,019,094 B2 | 9/2011 | Hsieh et al. |
| 8,086,008 B2 | 12/2011 | Coste-maniere et al. |
| D655,678 S | 3/2012 | Kobayashi et al. |
| D657,368 S | 4/2012 | Magee et al. |
| 8,239,066 B2 | 8/2012 | Jennings et al. |
| D667,838 S | 9/2012 | Magee et al. |
| D675,164 S | 1/2013 | Kobayashi et al. |
| D676,392 S | 2/2013 | Gassauer |
| D678,196 S | 3/2013 | Miyauchi et al. |
| D678,304 S | 3/2013 | Yakoub et al. |
| 8,423,182 B2 | 4/2013 | Robinson et al. |
| D687,146 S | 7/2013 | Juzkiw et al. |
| 8,504,136 B1 | 8/2013 | Sun et al. |
| 8,540,709 B2 | 9/2013 | Allen |
| 8,567,393 B2 | 10/2013 | Hickle et al. |
| D704,839 S | 5/2014 | Juzkiw et al. |
| 8,795,001 B1 | 8/2014 | Lam et al. |
| 8,819,581 B2 | 8/2014 | Nakamura et al. |
| D716,333 S | 10/2014 | Chotin et al. |
| 8,917,513 B1 | 12/2014 | Hazzard |

(56) References Cited

U.S. PATENT DOCUMENTS

| | | |
|---|---|---|
| 8,920,186 B2 | 12/2014 | Shishikura |
| 8,923,012 B2 | 12/2014 | Kaufman et al. |
| 8,968,296 B2 | 3/2015 | McPherson |
| 8,986,288 B2 | 3/2015 | Konishi |
| 9,017,326 B2 | 4/2015 | Dinardo et al. |
| D729,267 S | 5/2015 | Yoo et al. |
| 9,055,870 B2 | 6/2015 | Meador et al. |
| 9,065,394 B2 | 6/2015 | Lim et al. |
| 9,129,054 B2 | 9/2015 | Nawana et al. |
| 9,160,853 B1 | 10/2015 | Daddi et al. |
| 9,168,054 B2 | 10/2015 | Turner et al. |
| 9,168,085 B2 | 10/2015 | Juzkiw et al. |
| 9,168,091 B2 | 10/2015 | Janssen et al. |
| 9,198,711 B2 | 12/2015 | Joseph |
| 9,226,766 B2 | 1/2016 | Aldridge et al. |
| 9,226,791 B2 | 1/2016 | McCarthy et al. |
| 9,237,921 B2 | 1/2016 | Messerly et al. |
| 9,265,429 B2 | 2/2016 | St. Pierre et al. |
| 9,277,961 B2 | 3/2016 | Panescu et al. |
| 9,277,969 B2 | 3/2016 | Brannan et al. |
| 9,281,615 B1 | 3/2016 | Plaza et al. |
| 9,320,646 B2 | 4/2016 | Todd et al. |
| 9,345,481 B2 | 5/2016 | Hall et al. |
| 9,345,900 B2 | 5/2016 | Wu et al. |
| 9,351,653 B1 | 5/2016 | Harrison |
| 9,427,255 B2 | 8/2016 | Griffith et al. |
| 9,463,646 B2 | 10/2016 | Payne et al. |
| 9,474,565 B2 | 10/2016 | Shikhman et al. |
| D772,252 S | 11/2016 | Myers et al. |
| 9,486,271 B2 | 11/2016 | Dunning |
| 9,491,895 B2 | 11/2016 | Steeves et al. |
| 9,503,681 B1 | 11/2016 | Popescu et al. |
| 9,532,827 B2 | 1/2017 | Morgan et al. |
| 9,600,031 B2 | 3/2017 | Kaneko et al. |
| 9,603,277 B2 | 3/2017 | Morgan et al. |
| D783,675 S | 4/2017 | Yagisawa et al. |
| D784,270 S | 4/2017 | Bhattacharya |
| 9,666,974 B2 | 5/2017 | Bopp |
| 9,713,503 B2 | 7/2017 | Goldschmidt |
| 9,715,271 B2 | 7/2017 | Kaestner |
| 9,750,563 B2 | 9/2017 | Shikhman et al. |
| 9,770,103 B2 | 9/2017 | Cochran et al. |
| 9,773,093 B2 | 9/2017 | Bernini et al. |
| 9,782,214 B2 | 10/2017 | Houser et al. |
| 9,788,907 B1 | 10/2017 | Alvi et al. |
| 9,804,977 B2 | 10/2017 | Ghosh et al. |
| 9,867,670 B2 | 1/2018 | Brannan et al. |
| 9,892,564 B1 | 2/2018 | Cvetko et al. |
| 9,907,196 B2 | 2/2018 | Susini et al. |
| 9,935,794 B1 * | 4/2018 | Cao ............... H04L 5/0048 |
| 9,971,395 B2 | 5/2018 | Chenault et al. |
| 9,974,595 B2 | 5/2018 | Anderson et al. |
| 9,987,068 B2 | 6/2018 | Anderson et al. |
| 9,987,072 B2 | 6/2018 | McPherson |
| 10,028,402 B1 | 7/2018 | Walker |
| 10,039,589 B2 | 8/2018 | Virshek et al. |
| D832,211 S | 10/2018 | Ladd et al. |
| 10,098,527 B2 | 10/2018 | Weisenburgh, II et al. |
| 10,105,470 B2 | 10/2018 | Reasoner et al. |
| 10,109,835 B2 | 10/2018 | Yang |
| D834,541 S | 11/2018 | You et al. |
| 10,117,702 B2 | 11/2018 | Danziger et al. |
| 10,128,612 B1 | 11/2018 | Casto |
| 10,136,954 B2 | 11/2018 | Johnson et al. |
| 10,137,245 B2 | 11/2018 | Melker et al. |
| 10,147,148 B2 | 12/2018 | Wu et al. |
| 10,166,019 B2 | 1/2019 | Nawana et al. |
| 10,166,061 B2 | 1/2019 | Berry et al. |
| 10,170,205 B2 | 1/2019 | Curd et al. |
| 10,201,365 B2 | 2/2019 | Boudreaux et al. |
| 10,339,496 B2 | 7/2019 | Matson et al. |
| 10,357,184 B2 | 7/2019 | Crawford et al. |
| 10,386,990 B2 | 8/2019 | Shikhman et al. |
| 10,441,345 B2 | 10/2019 | Aldridge et al. |
| 10,449,004 B2 | 10/2019 | Ferro et al. |
| 10,475,244 B2 | 11/2019 | Cvetko et al. |
| 10,493,287 B2 | 12/2019 | Yoder et al. |
| 10,499,847 B2 | 12/2019 | Latimer et al. |
| 10,499,996 B2 | 12/2019 | de Almeida Barreto |
| 10,523,122 B2 | 12/2019 | Han et al. |
| 10,531,579 B2 | 1/2020 | Hsiao et al. |
| D876,466 S | 2/2020 | Kobayashi et al. |
| 10,561,753 B2 | 2/2020 | Thompson et al. |
| 10,602,007 B2 | 3/2020 | Takano |
| 10,610,310 B2 | 4/2020 | Todd et al. |
| 10,624,667 B2 | 4/2020 | Faller et al. |
| 10,624,691 B2 | 4/2020 | Wiener et al. |
| 10,675,100 B2 | 6/2020 | Frushour |
| 10,687,884 B2 | 6/2020 | Wiener et al. |
| 10,729,502 B1 | 8/2020 | Wolf et al. |
| 10,743,872 B2 | 8/2020 | Leimbach et al. |
| 10,758,309 B1 | 9/2020 | Chow et al. |
| 10,758,310 B2 | 9/2020 | Shelton, IV et al. |
| 10,772,673 B2 | 9/2020 | Allen, IV et al. |
| 10,878,966 B2 | 12/2020 | Wolf et al. |
| 10,881,399 B2 | 1/2021 | Shelton, IV et al. |
| 10,898,256 B2 | 1/2021 | Yates et al. |
| 10,925,598 B2 | 2/2021 | Scheib et al. |
| 10,932,705 B2 | 3/2021 | Muhsin et al. |
| 10,932,772 B2 | 3/2021 | Shelton, IV et al. |
| 10,950,982 B2 | 3/2021 | Regnier et al. |
| 10,987,176 B2 | 4/2021 | Poltaretskyi et al. |
| 10,989,724 B1 | 4/2021 | Holmes et al. |
| 11,000,270 B2 | 5/2021 | Scheib et al. |
| 11,006,100 B1 | 5/2021 | Douglas |
| D924,139 S | 7/2021 | Jayme |
| 11,056,244 B2 | 7/2021 | Shelton, IV et al. |
| 11,065,079 B2 | 7/2021 | Wolf et al. |
| 11,071,595 B2 | 7/2021 | Johnson et al. |
| D928,725 S | 8/2021 | Oberkircher et al. |
| D928,726 S | 8/2021 | Asher et al. |
| 11,083,489 B2 | 8/2021 | Fujii et al. |
| 11,114,199 B2 | 9/2021 | Moctezuma De La Barrera |
| 11,116,587 B2 | 9/2021 | Wolf et al. |
| D939,545 S | 12/2021 | Oberkircher et al. |
| 11,218,822 B2 | 1/2022 | Morgan et al. |
| 11,259,793 B2 | 3/2022 | Scheib et al. |
| 11,259,875 B2 | 3/2022 | Boutin et al. |
| 11,272,839 B2 | 3/2022 | Al-Ali et al. |
| 11,284,963 B2 | 3/2022 | Shelton, IV et al. |
| 11,296,540 B2 | 4/2022 | Kirleis et al. |
| 11,298,128 B2 | 4/2022 | Messerly et al. |
| 11,304,763 B2 | 4/2022 | Shelton, IV et al. |
| 11,314,846 B1 | 4/2022 | Colin et al. |
| 11,350,978 B2 | 6/2022 | Henderson et al. |
| 11,369,366 B2 | 6/2022 | Scheib et al. |
| 11,382,699 B2 | 7/2022 | Wassall et al. |
| 11,382,700 B2 | 7/2022 | Calloway et al. |
| 11,419,604 B2 | 8/2022 | Scheib et al. |
| 11,424,027 B2 | 8/2022 | Shelton, IV |
| 11,432,877 B2 | 9/2022 | Nash et al. |
| 11,464,581 B2 | 10/2022 | Calloway |
| 11,471,206 B2 | 10/2022 | Henderson et al. |
| 11,478,820 B2 | 10/2022 | Bales, Jr. et al. |
| 11,504,192 B2 | 11/2022 | Shelton, IV et al. |
| 11,510,720 B2 | 11/2022 | Morgan et al. |
| 11,510,750 B2 | 11/2022 | Dulin et al. |
| 2001/0029315 A1 | 10/2001 | Sakurai et al. |
| 2003/0078631 A1 | 4/2003 | Nelson et al. |
| 2003/0199794 A1 | 10/2003 | Sakurai et al. |
| 2003/0199864 A1 | 10/2003 | Eick |
| 2004/0030328 A1 | 2/2004 | Eggers et al. |
| 2004/0059323 A1 | 3/2004 | Sturm et al. |
| 2004/0111045 A1 | 6/2004 | Sullivan et al. |
| 2004/0164983 A1 | 8/2004 | Khozai |
| 2005/0010209 A1 | 1/2005 | Lee et al. |
| 2005/0013459 A1 | 1/2005 | Maekawa |
| 2005/0113823 A1 | 5/2005 | Reschke et al. |
| 2005/0165390 A1 | 7/2005 | Mauti et al. |
| 2005/0229110 A1 | 10/2005 | Gegner et al. |
| 2005/0251233 A1 | 11/2005 | Kanzius |
| 2006/0082542 A1 | 4/2006 | Morita et al. |
| 2006/0085049 A1 | 4/2006 | Cory et al. |
| 2006/0136622 A1 | 6/2006 | Rouvelin et al. |

(56) References Cited

U.S. PATENT DOCUMENTS

| | | |
|---|---|---|
| 2006/0149418 A1 | 7/2006 | Anvari |
| 2006/0256516 A1 | 11/2006 | Cho |
| 2007/0076363 A1 | 4/2007 | Liang et al. |
| 2007/0211930 A1 | 9/2007 | Dolwick et al. |
| 2007/0282321 A1 | 12/2007 | Shah et al. |
| 2008/0072896 A1 | 3/2008 | Setzer et al. |
| 2008/0129465 A1 | 6/2008 | Rao |
| 2008/0249377 A1 | 10/2008 | Molducci et al. |
| 2008/0316304 A1 | 12/2008 | Claus et al. |
| 2009/0036884 A1 | 2/2009 | Gregg et al. |
| 2009/0131929 A1 | 5/2009 | Shimizu |
| 2009/0192524 A1 | 7/2009 | Itkowitz et al. |
| 2009/0216091 A1 | 8/2009 | Arndt |
| 2009/0234352 A1 | 9/2009 | Behnke et al. |
| 2010/0036405 A1 | 2/2010 | Giordano et al. |
| 2010/0042010 A1 | 2/2010 | Dekker et al. |
| 2010/0053213 A1 | 3/2010 | Ishida et al. |
| 2010/0069939 A1 | 3/2010 | Konishi |
| 2010/0076453 A1 | 3/2010 | Morris et al. |
| 2010/0092006 A1 | 4/2010 | Rosen |
| 2010/0120266 A1 | 5/2010 | Rimborg |
| 2010/0198200 A1 | 8/2010 | Horvath |
| 2010/0312239 A1 | 12/2010 | Sclig |
| 2011/0105895 A1 | 5/2011 | Kornblau et al. |
| 2011/0118748 A1 | 5/2011 | Itkowitz |
| 2011/0125149 A1 | 5/2011 | El-Galley et al. |
| 2011/0130689 A1 | 6/2011 | Cohen et al. |
| 2011/0190588 A1 | 8/2011 | Mckay |
| 2011/0245630 A1 | 10/2011 | St. Pierre et al. |
| 2011/0273465 A1 | 11/2011 | Konishi et al. |
| 2011/0298814 A1 | 12/2011 | Mathew et al. |
| 2011/0306840 A1 | 12/2011 | Allen et al. |
| 2012/0029304 A1 | 2/2012 | Medina et al. |
| 2012/0082036 A1 | 4/2012 | Abedi et al. |
| 2012/0116380 A1 | 5/2012 | Madan et al. |
| 2012/0132661 A1 | 5/2012 | Gu et al. |
| 2013/0031201 A1 | 1/2013 | Kagan et al. |
| 2013/0038707 A1 | 2/2013 | Cunningham et al. |
| 2013/0176220 A1 | 7/2013 | Merschon et al. |
| 2013/0197357 A1 | 8/2013 | Green et al. |
| 2013/0197503 A1 | 8/2013 | Orszulak |
| 2013/0267975 A1 | 10/2013 | Timm et al. |
| 2013/0268283 A1 | 10/2013 | Vann et al. |
| 2013/0303851 A1 | 11/2013 | Griffith et al. |
| 2013/0321159 A1 | 12/2013 | Schofield et al. |
| 2014/0009894 A1 | 1/2014 | Yu |
| 2014/0052150 A1 | 2/2014 | Taylor et al. |
| 2014/0058714 A1 | 2/2014 | Boyer |
| 2014/0087573 A1 | 3/2014 | Kroeckel |
| 2014/0155721 A1 | 6/2014 | Hauck et al. |
| 2014/0194683 A1 | 7/2014 | Nakaguchi |
| 2014/0221740 A1 | 8/2014 | Kawula et al. |
| 2014/0226572 A1 | 8/2014 | Thota et al. |
| 2014/0262598 A1 | 9/2014 | Miki et al. |
| 2014/0263552 A1 | 9/2014 | Hall et al. |
| 2014/0343358 A1 | 11/2014 | Hameed et al. |
| 2015/0019259 A1 | 1/2015 | Qureshi et al. |
| 2015/0070388 A1 | 3/2015 | Sheaffer et al. |
| 2015/0190189 A1 | 7/2015 | Yates et al. |
| 2015/0272575 A1 | 10/2015 | Leimbach et al. |
| 2015/0289929 A1 | 10/2015 | Toth et al. |
| 2016/0045247 A1 | 2/2016 | Heim et al. |
| 2016/0058286 A1 | 3/2016 | Joshua et al. |
| 2016/0066184 A1 | 3/2016 | Bhargav-Spantzel et al. |
| 2016/0074096 A1 | 3/2016 | Lieu |
| 2016/0120591 A1 | 5/2016 | Smith et al. |
| 2016/0225192 A1 | 8/2016 | Jones et al. |
| 2016/0287312 A1 | 10/2016 | Tegg et al. |
| 2016/0287337 A1 | 10/2016 | Aram et al. |
| 2017/0000553 A1 | 1/2017 | Wiener et al. |
| 2017/0090507 A1 | 3/2017 | Wiener et al. |
| 2017/0189096 A1 | 7/2017 | Danziger et al. |
| 2017/0202595 A1 | 7/2017 | Shelton, IV |
| 2017/0209225 A1 | 7/2017 | Wu |
| 2017/0251305 A1 | 8/2017 | Fathollahi |
| 2017/0252091 A1 | 9/2017 | Honda |
| 2017/0258526 A1 | 9/2017 | Lang |
| 2017/0296036 A1 | 10/2017 | Newman |
| 2017/0296213 A1 | 10/2017 | Swensgard et al. |
| 2017/0319259 A1 | 11/2017 | Dunning |
| 2017/0333275 A1 | 11/2017 | Itkowitz et al. |
| 2017/0360466 A1 | 12/2017 | Brown et al. |
| 2017/0367766 A1 | 12/2017 | Mahfouz |
| 2018/0014872 A1 | 1/2018 | Dickerson |
| 2018/0032130 A1 | 2/2018 | Meglan |
| 2018/0042659 A1 | 2/2018 | Rupp et al. |
| 2018/0043037 A1 | 2/2018 | Dalma-Weiszhausz et al. |
| 2018/0049795 A1 | 2/2018 | Swayze et al. |
| 2018/0065248 A1 | 3/2018 | Barral et al. |
| 2018/0078216 A1 | 3/2018 | Baker et al. |
| 2018/0082480 A1 | 3/2018 | White et al. |
| 2018/0092699 A1 | 4/2018 | Finley |
| 2018/0099161 A1 | 4/2018 | Honda |
| 2018/0173323 A1 | 6/2018 | Harvey et al. |
| 2018/0221005 A1 | 8/2018 | Hamel et al. |
| 2018/0228528 A1 | 8/2018 | Fraasch et al. |
| 2018/0235441 A1 | 8/2018 | Huang et al. |
| 2018/0243573 A1 | 8/2018 | Yoder et al. |
| 2018/0262916 A1 | 9/2018 | Polley et al. |
| 2018/0263557 A1 | 9/2018 | Kahlman |
| 2018/0289338 A1 | 10/2018 | Meador et al. |
| 2018/0317826 A1* | 11/2018 | Muhsin ............... G06F 13/4282 |
| 2018/0333207 A1 | 11/2018 | Moctezuma De la Barrera |
| 2018/0368930 A1 | 12/2018 | Esterberg et al. |
| 2019/0035153 A1 | 1/2019 | Dange |
| 2019/0038362 A1 | 2/2019 | Nash et al. |
| 2019/0069957 A1 | 3/2019 | Barral et al. |
| 2019/0104919 A1 | 4/2019 | Shelton, IV et al. |
| 2019/0125361 A1 | 5/2019 | Shelton, IV et al. |
| 2019/0125451 A1 | 5/2019 | Srimohanarajah et al. |
| 2019/0125454 A1 | 5/2019 | Stokes et al. |
| 2019/0125455 A1 | 5/2019 | Shelton, IV et al. |
| 2019/0125459 A1 | 5/2019 | Shelton et al. |
| 2019/0183576 A1 | 6/2019 | Fahim et al. |
| 2019/0183591 A1 | 6/2019 | Johnson et al. |
| 2019/0200844 A1 | 7/2019 | Shelton, IV et al. |
| 2019/0200906 A1 | 7/2019 | Shelton, IV et al. |
| 2019/0200981 A1 | 7/2019 | Harris et al. |
| 2019/0200987 A1 | 7/2019 | Shelton, IV et al. |
| 2019/0201046 A1 | 7/2019 | Shelton, IV et al. |
| 2019/0201102 A1 | 7/2019 | Shelton, IV et al. |
| 2019/0201114 A1 | 7/2019 | Shelton, IV et al. |
| 2019/0201116 A1 | 7/2019 | Shelton, IV et al. |
| 2019/0201117 A1 | 7/2019 | Yates et al. |
| 2019/0201127 A1 | 7/2019 | Shelton, IV et al. |
| 2019/0201136 A1 | 7/2019 | Shelton, IV et al. |
| 2019/0201137 A1 | 7/2019 | Shelton, IV et al. |
| 2019/0201140 A1 | 7/2019 | Yates et al. |
| 2019/0201158 A1 | 7/2019 | Shelton, IV et al. |
| 2019/0205001 A1 | 7/2019 | Messerly et al. |
| 2019/0206004 A1 | 7/2019 | Shelton, IV et al. |
| 2019/0206562 A1 | 7/2019 | Shelton, IV et al. |
| 2019/0206563 A1 | 7/2019 | Shelton, IV et al. |
| 2019/0206565 A1 | 7/2019 | Shelton, IV |
| 2019/0206569 A1 | 7/2019 | Shelton et al. |
| 2019/0224434 A1 | 7/2019 | Silver et al. |
| 2019/0236840 A1 | 8/2019 | Zuckerman et al. |
| 2019/0247141 A1 | 8/2019 | Batchelor et al. |
| 2019/0278262 A1 | 9/2019 | Taylor et al. |
| 2019/0279524 A1 | 9/2019 | Stoyanov et al. |
| 2019/0290297 A1 | 9/2019 | Haider et al. |
| 2019/0348169 A1 | 11/2019 | Gibby et al. |
| 2019/0371012 A1 | 12/2019 | Flexman et al. |
| 2020/0004487 A1 | 1/2020 | Hanajima et al. |
| 2020/0015895 A1 | 1/2020 | Frielinghaus et al. |
| 2020/0015898 A1 | 1/2020 | Scheib et al. |
| 2020/0015899 A1 | 1/2020 | Scheib et al. |
| 2020/0015900 A1 | 1/2020 | Scheib et al. |
| 2020/0015902 A1 | 1/2020 | Scheib et al. |
| 2020/0015906 A1 | 1/2020 | Scheib et al. |
| 2020/0015907 A1 | 1/2020 | Scheib |
| 2020/0015914 A1 | 1/2020 | Scheib et al. |
| 2020/0015924 A1 | 1/2020 | Scheib et al. |
| 2020/0038120 A1 | 2/2020 | Ziraknejad et al. |

(56) References Cited

U.S. PATENT DOCUMENTS

| | | |
|---|---|---|
| 2020/0078070 A1 | 3/2020 | Henderson et al. |
| 2020/0078071 A1 | 3/2020 | Asher |
| 2020/0078076 A1 | 3/2020 | Henderson et al. |
| 2020/0078078 A1 | 3/2020 | Henderson et al. |
| 2020/0078080 A1 | 3/2020 | Henderson et al. |
| 2020/0078081 A1 | 3/2020 | Jayme et al. |
| 2020/0078082 A1 | 3/2020 | Henderson et al. |
| 2020/0078083 A1 | 3/2020 | Sprinkle et al. |
| 2020/0078089 A1 | 3/2020 | Henderson et al. |
| 2020/0078110 A1 | 3/2020 | Henderson et al. |
| 2020/0078111 A1 | 3/2020 | Oberkircher et al. |
| 2020/0078112 A1 | 3/2020 | Henderson et al. |
| 2020/0078113 A1 | 3/2020 | Sawhney et al. |
| 2020/0078114 A1 | 3/2020 | Asher et al. |
| 2020/0078115 A1 | 3/2020 | Asher et al. |
| 2020/0078116 A1 | 3/2020 | Oberkircher et al. |
| 2020/0078117 A1 | 3/2020 | Henderson et al. |
| 2020/0078118 A1 | 3/2020 | Henderson et al. |
| 2020/0078119 A1 | 3/2020 | Henderson et al. |
| 2020/0078120 A1 | 3/2020 | Aldridge et al. |
| 2020/0081585 A1 | 3/2020 | Petre et al. |
| 2020/0090808 A1 | 3/2020 | Carroll et al. |
| 2020/0093357 A1 | 3/2020 | Scott et al. |
| 2020/0100825 A1 | 4/2020 | Henderson et al. |
| 2020/0100830 A1 | 4/2020 | Henderson et al. |
| 2020/0106220 A1 | 4/2020 | Henderson et al. |
| 2020/0159313 A1 | 5/2020 | Gibby et al. |
| 2020/0237031 A1 | 7/2020 | Daniels et al. |
| 2020/0237452 A1 | 7/2020 | Wolf et al. |
| 2020/0268469 A1 | 8/2020 | Wolf et al. |
| 2020/0268472 A1 | 8/2020 | Wolf et al. |
| 2020/0305924 A1 | 10/2020 | Carroll |
| 2020/0305945 A1 | 10/2020 | Morgan et al. |
| 2020/0315707 A1 | 10/2020 | Venkataraman |
| 2020/0322516 A1 | 10/2020 | Doser et al. |
| 2020/0342228 A1 | 10/2020 | Prevrhal et al. |
| 2020/0359892 A1 | 11/2020 | Rollins et al. |
| 2020/0384287 A1 | 12/2020 | Hetz |
| 2020/0405529 A1 | 12/2020 | Taylor et al. |
| 2021/0000564 A1 | 1/2021 | Amanatullah et al. |
| 2021/0093390 A1 | 4/2021 | Poltaretskyi et al. |
| 2021/0121246 A1 | 4/2021 | Gudalo |
| 2021/0128254 A1 | 5/2021 | Geric et al. |
| 2021/0158779 A1 | 5/2021 | Singh |
| 2021/0169578 A1 | 6/2021 | Calloway et al. |
| 2021/0169581 A1 | 6/2021 | Calloway et al. |
| 2021/0174956 A1 | 6/2021 | Mcginley et al. |
| 2021/0192759 A1 | 6/2021 | Lang |
| 2021/0193681 A1 | 6/2021 | Baek |
| 2021/0196381 A1 | 7/2021 | Eckert et al. |
| 2021/0196383 A1 | 7/2021 | Shelton, IV et al. |
| 2021/0203889 A1 | 7/2021 | Fung et al. |
| 2021/0205020 A1 | 7/2021 | Shelton, IV et al. |
| 2021/0212717 A1 | 7/2021 | Yates et al. |
| 2021/0236755 A1 | 8/2021 | King et al. |
| 2021/0259789 A1 | 8/2021 | Wright et al. |
| 2021/0264680 A1 | 8/2021 | Cvetko et al. |
| 2021/0267664 A1 | 9/2021 | Lennartz et al. |
| 2021/0306691 A1 | 9/2021 | Thomas et al. |
| 2021/0307861 A1 | 10/2021 | Hufford et al. |
| 2021/0313052 A1 | 10/2021 | Makrinich et al. |
| 2021/0333864 A1 | 10/2021 | Harvey et al. |
| 2021/0346092 A1 | 11/2021 | Redmond et al. |
| 2021/0369394 A1 | 12/2021 | Braido et al. |
| 2021/0385889 A1 | 12/2021 | Patel |
| 2022/0032442 A1 | 2/2022 | Sheffield et al. |
| 2022/0104896 A1 | 4/2022 | Shelton, IV et al. |
| 2022/0104897 A1 | 4/2022 | Shelton, IV et al. |
| 2022/0104911 A1 | 4/2022 | Shelton, IV et al. |
| 2022/0104912 A1 | 4/2022 | Shelton, IV et al. |
| 2022/0142573 A1 | 5/2022 | Li et al. |
| 2022/0151704 A1 | 5/2022 | Nikou |
| 2022/0155910 A1 | 5/2022 | Jeong |
| 2022/0160428 A1 | 5/2022 | Murray et al. |
| 2022/0188545 A1 | 6/2022 | Nagar et al. |
| 2022/0237878 A1 | 7/2022 | Tartz et al. |
| 2022/0257333 A1 | 8/2022 | Haider |
| 2022/0261056 A1 | 8/2022 | Motoi et al. |
| 2022/0283631 A1 | 9/2022 | Peng |
| 2022/0287676 A1 | 9/2022 | Steines et al. |
| 2022/0313338 A1 | 10/2022 | Carroll et al. |
| 2022/0313341 A1 | 10/2022 | Wiener et al. |
| 2022/0313342 A1 | 10/2022 | Leuck et al. |
| 2022/0313357 A1 | 10/2022 | Geresy et al. |
| 2022/0313369 A1 | 10/2022 | Oberkircher et al. |
| 2022/0313370 A1 | 10/2022 | Morgan et al. |
| 2022/0313371 A1 | 10/2022 | Morgan et al. |
| 2022/0313372 A1 | 10/2022 | Herman et al. |
| 2022/0313373 A1 | 10/2022 | Morgan et al. |
| 2022/0317750 A1 | 10/2022 | Jayme et al. |
| 2022/0317751 A1 | 10/2022 | Samuel et al. |
| 2022/0318179 A1 | 10/2022 | Morgan et al. |
| 2022/0319685 A1 | 10/2022 | Vachon et al. |
| 2022/0319693 A1 | 10/2022 | Oberkircher et al. |
| 2022/0321059 A1 | 10/2022 | Samuel et al. |
| 2022/0322523 A1 | 10/2022 | Jayme et al. |
| 2022/0331013 A1 | 10/2022 | Shelton, IV et al. |
| 2022/0331047 A1 | 10/2022 | Shelton, IV et al. |
| 2022/0331048 A1 | 10/2022 | Shelton, IV et al. |
| 2022/0331049 A1 | 10/2022 | Shelton, IV et al. |
| 2022/0331050 A1 | 10/2022 | Shelton, IV et al. |
| 2022/0331051 A1 | 10/2022 | Shelton, IV et al. |
| 2022/0331052 A1 | 10/2022 | Shelton, IV et al. |
| 2022/0331053 A1 | 10/2022 | Kimball et al. |
| 2022/0331054 A1 | 10/2022 | Kimball et al. |
| 2022/0331056 A1 | 10/2022 | Shelton, IV et al. |
| 2022/0334787 A1 | 10/2022 | Jogan et al. |
| 2022/0335604 A1 | 10/2022 | Vanosdoll et al. |
| 2022/0335660 A1 | 10/2022 | Shelton, IV et al. |
| 2022/0335696 A1 | 10/2022 | Shelton, IV et al. |
| 2022/0336078 A1 | 10/2022 | Wise et al. |
| 2022/0336097 A1 | 10/2022 | Shelton, IV et al. |
| 2022/0337891 A1 | 10/2022 | Burnley et al. |
| 2022/0387128 A1 | 12/2022 | Bail et al. |
| 2023/0038130 A1 | 2/2023 | Cvetko et al. |
| 2023/0061534 A1 | 3/2023 | Stopek |
| 2023/0071306 A1 | 3/2023 | Miller et al. |
| 2023/0072423 A1 | 3/2023 | Osborn et al. |
| 2023/0121709 A1 | 4/2023 | Xu et al. |
| 2023/0157757 A1 | 5/2023 | Braido et al. |
| 2023/0157762 A1 | 5/2023 | Braido et al. |
| 2024/0130795 A1 | 4/2024 | Clayton et al. |
| 2024/0138931 A1 | 5/2024 | Lefauconnier |
| 2024/0176441 A1 | 5/2024 | Yang et al. |

FOREIGN PATENT DOCUMENTS

| | | |
|---|---|---|
| EP | 0473987 A1 | 3/1992 |
| EP | 0929263 B1 | 7/1999 |
| EP | 1006892 B1 | 6/2009 |
| EP | 2942023 A2 | 11/2015 |
| EP | 3053279 A1 | 8/2016 |
| EP | 3387982 A1 | 10/2018 |
| JP | 2001029353 A | 2/2001 |
| WO | WO-0112089 A1 | 2/2001 |
| WO | WO-2008053485 A1 | 5/2008 |
| WO | WO-2014031800 A1 | 2/2014 |
| WO | WO-2014071184 A1 | 5/2014 |
| WO | WO-2015047693 A1 | 4/2015 |
| WO | 2016154557 A1 | 9/2016 |
| WO | WO-2017058617 A2 | 4/2017 |
| WO | WO-2018116247 A1 | 6/2018 |
| WO | WO-2019215354 A1 | 11/2019 |
| WO | 2020112217 A1 | 6/2020 |
| WO | 2020180917 A1 | 9/2020 |
| WO | WO-2021044136 A1 | 3/2021 |
| WO | 2021/146313 A1 | 7/2021 |

OTHER PUBLICATIONS

IEEE Std 802.3-2012 (Revision of IEEE Std 802.3-2008, published Dec. 28, 2012.

(56) References Cited

OTHER PUBLICATIONS

Sorrells, P., "Application Note AN680. Passive RFID Basics," retrieved from http://ww1.microchip.com/downloads/en/AppNotes/00680b.pdf on Feb. 26, 2020, Dec. 31, 1998, pp. 1-7.
Zhu et al. "Haptic-feedback smart glove as a creative human-machine interface (HMI) for virtual/augmented reality applications," Sci. Adv, vol. 6, No. 19, May 8, 2020.
Qian, et al., "A Review of Augmented Reality in Robotic-Assisted Surgery", IEEE Transactions on Medical Robotics and Bionics, IEEE, vol. 2, No. 1, pp. 1-16, Feb. 2020.
Yu et al., "Skin-Integrated Wireless Haptic Interfaces for Virtual and Augmented Reality," Nature, vol. 575, pp. 473-479, Nov. 21, 2019.
Li et al., "Wearable Energy Harvesters Generating Electricity From Low-Frequency Human Limb Movement," Microsystems & Nanoengineering (2018), vol. 4(24), 13 pages.
Vávra et al., "Recent Development of Augmented Reality in Surgery: A Review", Journal of Healthcare Engineering, vol. 2017, Article ID 4574172, Aug. 21, 2017, pp. 1-9.
International Search Report and Written Opinion received for PCT Application No. PCT/IB2022/053360, mailed on Jul. 4, 2022, 12 pages.
International Search Report and Written Opinion received for PCT Application No. PCT/IB2022/053362, mailed on Jul. 1, 2022, 13 pages.
International Search Report and Written Opinion received for PCT Application No. PCT/IB2022/053363, mailed on Jun. 30, 2022, 14 pages.
International Search Report and Written Opinion received for PCT Application No. PCT/IB2022/053364, mailed on Jul. 8, 2022, 11 pages.
International Search Report and Written Opinion received for PCT Application No. PCT/IB2022/053365, mailed on Jul. 4, 2022, 16 pages.
International Search Report and Written Opinion received for PCT Application No. PCT/IB2022/053369, mailed on Jul. 13, 2022, 12 pages.
International Search Report and Written Opinion received for PCT Application No. PCT/IB2022/053370, mailed on Jul. 15, 2022, 14 pages.
International Search Report and Written Opinion received for PCT Application No. PCT/IB2022/053371, mailed on Jul. 5, 2022, 12 pages.
International Search Report and Written Opinion received for PCT Application No. PCT/IB2022/053377, mailed on Jun. 22, 2022, 12 pages.
International Search Report and Written Opinion received for PCT Application No. PCT/IB2022/053378, mailed on Jul. 7, 2022, 13 pages.
Invitation to Pay Additional Fees received for PCT Application No. PCT/IB2022/053375, mailed on Jul. 15, 2022, 11 pages.
Zherdeva, et al., "Virtual Scalpel Simulation in the VR and AR Environments", Proceedings Of SPIE, vol. 11310, Feb. 19, 2020, 7 pages.

* cited by examiner

Visual Indicators — 12100

| Status | LED |
|---|---|
| Pairing Mode | Red and Blue flashing alternately |
| Rx Mode Connecting | Blue LED flashing |
| Rx Mode Connected | Blue LED is solid |
| Tx Mode Connecting | Red LED flashing |
| Tx ModeConnected | Red LED is solid |
| Not Connected | Red or Blue flash every 0.5 seconds |
| Searching | 0.5 seconds |

FIG. 14

INDICATION OF THE COUPLE PAIR OF REMOTE CONTROLS WITH REMOTE DEVICES FUNCTIONS

CROSS-REFERENCE TO RELATED APPLICATIONS

This application claims the benefit under 35 U.S.C. § 119(e) to U.S. Provisional Patent Application No. 63/174,674, titled HEADS UP DISPLAY, filed Apr. 14, 2021 and to U.S. Provisional Patent Application No. 63/284,326, titled INTRAOPERATIVE DISPLAY FOR SURGICAL SYSTEMS, filed Nov. 30, 2021, the disclosure of each of which is herein incorporated by reference in its entirety.

BACKGROUND

This disclosure relates to apparatuses, systems, and methods for providing an augmented reality interactive experience during a surgical procedure. During a surgical procedure it would be desirable to provide an augmented reality interactive experience of a real-world environment where objects that reside in the real world are enhanced by overlaying computer-generated perceptual information, sometimes across multiple sensory modalities, including visual, auditory, haptic, somatosensory, and olfactory. In the context of this disclosure, images of a surgical field and surgical instruments and other objects appearing in the surgical field are enhanced by overlaying computer-generated visual, auditory, haptic, somatosensory, olfactory, or other sensory information onto the real world images of the surgical field and instruments or other objects appearing in the surgical field. The images may be streamed in real time or may be still images.

Real world surgical instruments include a variety of surgical devices including energy, staplers, or combined energy and staplers. Energy based medical devices include, without limitation, radio-frequency (RF) based monopolar and bipolar electrosurgical instruments, ultrasonic surgical instruments, combination RF electrosurgical and ultrasonic instruments, combination RF electrosurgical and mechanical staplers, among others. Surgical stapler devices are surgical instruments used to cut and staple tissue in a variety of surgical procedures, including bariatric, thoracic, colorectal, gynecologic, urologic and general surgery.

SUMMARY

In various instances, this disclosure provides a method of assessing inter-device communication pairing in a surgical setting. The method may include transmitting, by a first intelligent medical device, wireless communication data within the surgical setting, receiving, by a second intelligent medical device, the wireless communication data from the first intelligent medical device, determining, by the second intelligent medical device, communication pairing data indicative of an inter-device communication pairing of the second intelligent medical device with the first intelligent medical device, transmitting, by the second intelligent medical device, the communication pairing data to a modular control tower, and displaying, by the modular control tower on a display device, an augmented reality display comprising one or more virtual objects indicative of the inter-device communication pairing.

In various instances, this disclosure provides an intelligent medical system including a first intelligent medical device, configured to transmit wireless communication data within a surgical environment, a second intelligent medical device, configured to receive the wireless communication data from the first intelligent medical device within the surgical environment, a display device, and a modular control tower in data communication with the first intelligent medical device, the second intelligent medical device, and the display device. The second intelligent medical device may be configured to determine a communication pairing status indicative of an inter-device communication pairing of the second intelligent medical device with the first intelligent medical device based at least in part on the transmitted wireless communication data. The second intelligent medical device may be configured to transmit the communication pairing status to the modular control tower. The modular control tower may be configured to the display device to display an augmented reality display comprising one or more virtual objects indicative of the inter-device communication pairing status.

FIGURES

The various aspects described herein, both as to organization and methods of operation, together with further objects and advantages thereof, may best be understood by reference to the following description, taken in conjunction with the accompanying drawings as follows.

FIG. 14 is a list of visual indicia associated with different functions during a wireless communication pairing of two instruments, in accordance with one aspect of the present disclosure.

Corresponding reference characters indicate corresponding parts throughout the several views. The exemplifications set out herein illustrate various disclosed embodiments, in one form, and such exemplifications are not to be construed as limiting the scope thereof in any manner.

DESCRIPTION

Figure 1:
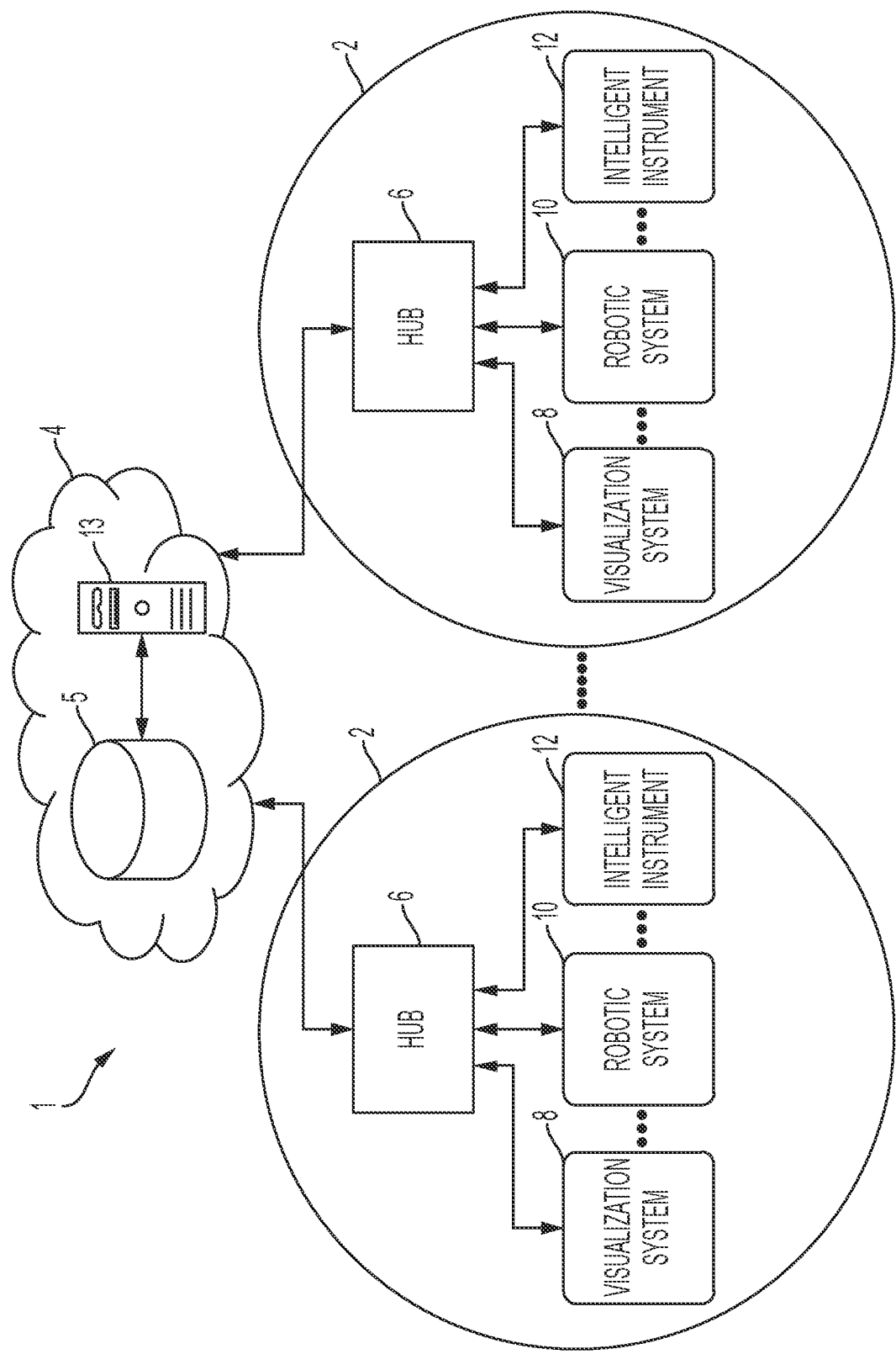
FIG. 1 is a block diagram of a computer-implemented interactive surgical system, according to one aspect of this disclosure.

Applicant of the present application owns the following U.S. Patent Applications filed concurrently herewith, the disclosures of each of which is herein incorporated by reference in its entirety:

- U.S. patent application Ser. No. 17/688,589, titled METHOD FOR INTRAOPERATIVE DISPLAY FOR SURGICAL SYSTEMS;
- U.S. patent application Ser. No. 17/688,597, titled UTILIZATION OF SURGICAL DATA VALUES AND SITUATIONAL AWARENESS TO CONTROL THE OVERLAY IN SURGICAL FIELD VIEW;
- U.S. patent application Ser. No. 17/688,605, titled SELECTIVE AND ADJUSTABLE MIXED REALITY OVERLAY IN SURGICAL FIELD VIEW;
- U.S. patent application Ser. No. 17/688,615, titled RISK BASED PRIORITIZATION OF DISPLAY ASPECTS IN SURGICAL FIELD VIEW;
- U.S. patent application Ser. No. 17/688,626, titled SYSTEMS AND METHODS FOR CONTROLLING SURGICAL DATA OVERLAY;
- U.S. patent application Ser. No. 17/688,633, titled SYSTEMS AND METHODS FOR CHANGING DISPLAY OVERLAY OF SURGICAL FIELD VIEW BASED ON TRIGGERING EVENTS;
- U.S. patent application Ser. No.17/688,638, titled CUSTOMIZATION OF OVERLAID DATA AND CONFIGURATION;
- U.S. patent application Ser. No. 17/688,646, titled COOPERATIVE OVERLAYS OF INTERACTING INSTRUMENTS WHICH RESULT IN BOTH OVERLAYS BEING EFFECTED;
- U.S. patent application Ser. No. 17/688,651, titled ANTICIPATION OF INTERACTIVE UTILIZATION OF COMMON DATA OVERLAYS BY DIFFERENT USERS;
- U.S. patent application Ser. No. 17/688,653, titled MIXING DIRECTLY VISUALIZED WITH RENDERED ELEMENTS TO DISPLAY BLENDED ELEMENTS AND ACTIONS HAPPENING ON-SCREEN AND OFF-SCREEN;
- U.S. patent application Ser. No. 17/688,655, titled SYSTEM AND METHOD FOR TRACKING A PORTION OF THE USER AS A PROXY FOR NON-MONITORED INSTRUMENT;
- U.S. patent application Ser. No. 17/688,656, titled UTILIZING CONTEXTUAL PARAMETERS OF ONE OR MORE SURGICAL DEVICES TO PREDICT A FREQUENCY INTERVAL FOR DISPLAYING SURGICAL INFORMATION;
- U.S. patent application Ser. No. 17/688,660, titled COOPERATION AMONG MULTIPLE DISPLAY SYSTEMS TO PROVIDE A HEALTHCARE USER CUSTOMIZED INFORMATION;
- U.S. patent application Ser. No. 17/688,663, titled INTRAOPERATIVE DISPLAY FOR SURGICAL SYSTEMS;
- U.S. patent application Ser. No. 17/688,667, titled ADAPTATION AND ADJUSTABILITY OR OVERLAID INSTRUMENT INFORMATION FOR SURGICAL SYSTEMS; and
- U.S. patent application Ser. No. 17/688,671, titled MIXED REALITY FEEDBACK SYSTEMS THAT COOPERATE TO INCREASE EFFICIENT PERCEPTION OF COMPLEX DATA FEEDS.

Applicant of this application owns the following U.S. Patent Applications, the disclosure of each of which is herein incorporated by reference in its entirety:

- U.S. patent application Ser. No. 16/209,423, titled METHOD OF COMPRESSING TISSUE WITHIN A STAPLING DEVICE AND SIMULTANEOUSLY DISPLAYING THE LOCATION OF THE TISSUE WITHIN THE JAWS, now U.S. Patent Publication No. US-2019-0200981-A1;
- U.S. patent application Ser. No. 16/209,453, titled METHOD FOR CONTROLLING SMART ENERGY DEVICES, now U.S. Patent Publication No. US-2019-0201046-A1.

Communication pairing between devices represents a simple and effective way in which two devices may share information. One example may be the wireless pairing between a set of headphones and a smart phone, so that the user can hear an audio output of the smart phone. In a surgical environment, it may be useful to control a handheld surgical device by means of a foot pedal that is not wired to the device, since a wire may pose a tripping hazard to the user of the handheld device. While wireless communication pairing between devices is a useful adjunct in the surgical environment, it may be recognized that complex surgeries may require multiple surgical devices in wireless communication with multiple control devices. In such an environment, communication control between various pairs of devices may become difficult. For example, some devices may not pair properly due to signal interference. In another example a surgical device may pair incorrectly with a control device. In some other examples, multiple surgical devices may attempt to pair with a single control device. Aspects disclosed herein address the issue of a complex communication environment and how users of various devices may determine that correct device pairing has occurred, or receive notification that the devices have not been properly paired. Some other aspects disclosed herein address how incorrect device pairing may be resolved.

Before explaining various aspects of surgical devices and generators in detail, it should be noted that the illustrative examples are not limited in application or use to the details of construction and arrangement of parts illustrated in the accompanying drawings and description. The illustrative examples may be implemented or incorporated in other aspects, variations and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects and/or examples.

Various aspects are directed to onscreen displays for surgical systems for a variety of energy and surgical stapler based medical devices. Energy based medical devices include, without limitation, radio-frequency (RF) based monopolar and bipolar electrosurgical instruments, ultrasonic surgical instruments, combination RF electrosurgical and ultrasonic instruments, combination RF electrosurgical and mechanical staplers, among others. Surgical stapler devices include and combined surgical staplers with electrosurgical and/or ultrasonic devices. Aspects of the ultrasonic surgical devices can be configured for transecting and/or coagulating tissue during surgical procedures, for example. Aspects of the electrosurgical devices can be configured for transecting, coagulating, sealing, welding and/or desiccating tissue during surgical procedures, for example. Aspects of the surgical stapler devices can be configured for transecting and stapling tissue during surgical procedures and in some aspects, the surgical stapler devices may be configured to delivery RF energy to the tissue during surgical procedures. Electrosurgical devices are configured to deliver therapeutic and/or nontherapeutic RF energy to the tissue. Elements of surgical staplers, electrosurgical, and ultrasonic devices may be used in combination in a single surgical instrument.

In various aspects, the present disclosure provides onscreen displays of real time information to the OR team during a surgical procedure. In accordance with various aspects of the present disclosure, many new and unique onscreen displays are provided to display onscreen a variety of visual information feedback to the OR team. According to the present disclosure, visual information may comprise one or more than one of various visual media with or without sound. Generally, visual information comprises still photography, motion picture photography, video or audio recording, graphic arts, visual aids, models, display, visual presentation services, and the support processes. The visual information can be communicated on any number of display options such as the primary OR screen, the energy or surgical stapler device itself, a tablet, augmented reality glasses, among others, for example.

In various aspects, the present disclosure provides a large list of potential options to communicate visual information in real time to the OR team, without overwhelming the OR team with too much visual information. For example, in various aspects, the present disclosure provides onscreen displays of visual information to enable the surgeon, or other members of the OR team, to selectively activate onscreen displays such as icons surrounding the screen option to manage a wealth of visual information. One or a combination of factors can be used to determine the active display, these may include energy based (e.g., electrosurgical, ultrasonic) or mechanical based (e.g., staplers) surgical devices in use, the estimated risk associated with a given display, the experience level of the surgeon and the surgeons' choice among other things. In other aspect, the visual information may comprises rich data overlaid or superimposed into the surgical field of view to manage the visual information. In various aspects described hereinbelow, comprise superimposed imagery that requires video analysis and tracking to properly overlay the data. Visual information data communicated in this manner, as opposed to static icons, may provide additional useful visual information in a more concise and easy to understand way to the OR team.

In various aspects, the present disclosure provides techniques for selectively activating onscreen displays such as icons surrounding the screen to manage visual information during a surgical procedure. In other aspects, the present disclosure provides techniques for determining the active display using one or a combination of factors. In various aspects, the techniques according to the resent disclosure may comprise selecting the energy based or mechanical based surgical device in use as the active display, estimating risk associated with a given display, utilizing the experience level of the surgeon or OR team making the selection, among other things.

In other aspects, the techniques according to the present disclosure may comprise overlaying or superimposing rich data onto the surgical field of view to manage the visual information. A number of the display arrangements described by the present disclosure involve overlaying various visual representations of surgical data onto a livestream of a surgical field. As used herein the term overlay comprises a translucent overlay, a partial overlay, and/or a moving overlay. Graphical overlays may be in the form of a transparent graphic, semitransparent graphic, or opaque graphic, or a combination of transparent, semitransparent, and opaque elements or effects. Moreover, the overlay can be positioned on, or at least partially on, or near an object in the surgical field such as, for example, an end effector and/or a critical surgical structure. Certain display arrangements may comprise a change in one or more display elements of an overlay including a change in color, size, shape, display time, display location, display frequency, highlighting, or a combination thereof, based on changes in display priority values. The graphical overlays are rendered on top of the active display monitor to convey important information quickly and efficiently to the OR team.

In other aspects, the techniques according to the present disclosure may comprise superimposing imagery that requires analyzing video and tracking for properly overlaying the visual information data. In other aspects, the techniques according to the present disclosure may comprise communicating rich visual information, as opposed to simple static icons, to provide additional visual information to the OR team in a more concise and easy to understand manner. In other aspects, the visual overlays may be used in combination with audible and/or somatosensory overlays such as thermal, chemical, and mechanical devices, and combinations thereof.

The following description is directed generally to apparatuses, systems, and methods that provide an augmented reality (AR) interactive experience during a surgical procedure. In this context, images of a surgical field and surgical instruments and other objects appearing in the surgical field are enhanced by overlaying computer-generated visual, auditory, haptic, somatosensory, olfactory, or other sensory information onto the real world images of the surgical field, instruments, and/or other objects appearing in the surgical field. The images may be streamed in real time or may be still images. Augmented reality is a technology for rendering and displaying virtual or "augmented" virtual objects, data, or visual effects overlaid on a real environment. The real environment may include a surgical field. The virtual objects overlaid on the real environment may be represented as anchored or in a set position relative to one or more aspects of the real environment. In a non-limiting example, if a real world object exits the real environment field of view, a virtual object anchored to the real world object would also exit the augmented reality field of view.

A number of the display arrangements described by the present disclosure involve overlaying various visual representations of surgical data onto a livestream of a surgical field. As used herein the term overlaying comprises a translucent overlay, a partial overlay, and/or a moving overlay. Moreover, the overlay can be positioned on, or at least partially on, or near an object in the surgical field such as, for example, an end effector and/or a critical surgical structure. Certain display arrangements may comprise a change in one or more display elements of an overlay including a change in color, size, shape, display time, display location, display frequency, highlighting, or a combination thereof, based on changes in display priority values.

As described herein AR is an enhanced version of the real physical world that is achieved through the use of digital visual elements, sound, or other sensory stimuli delivered via technology. Virtual Reality (VR) is a computer-generated environment with scenes and objects that appear to be real, making the user feel they are immersed in their surroundings. This environment is perceived through a device known as a Virtual Reality headset or helmet. Mixed reality (MR) and AR are both considered immersive technologies, but they aren't the same. MR is an extension of Mixed reality that allows real and virtual elements to interact in an environment. While AR adds digital elements to a live view often by using a camera, an MR experience combines elements of both AR and VR, where real-world and digital objects interact.

In an AR environment, one or more computer-generated virtual objects may be displayed along with one or more real (i.e., so-called "real world") elements. For example, a real-time image or video of a surrounding environment may be shown on a computer screen display with one or more overlaying virtual objects. Such virtual objects may provide complementary information relating to the environment or generally enhance a user's perception and engagement with the environment. Conversely, the real-time image or video of the surrounding environment may additionally or alternatively enhance a user's engagement with the virtual objects shown on the display.

The apparatuses, systems, and methods in the context of this disclosure enhance images received from one or more imaging devices during a surgical procedure. The imaging devices may include a variety of scopes used during non-invasive and minimally invasive surgical procedures, an AR device, and/or a camera to provide images during open surgical procedures. The images may be streamed in real time or may be still images. The apparatuses, systems, and methods provide an augmented reality interactive experience by enhancing images of the real world surgical environment by overlaying virtual objects or representations of data and/or real objects onto the real surgical environment. The augmented reality experience may be viewed on a display and/or an AR device that allows a user to view the overlaid virtual objects onto the real world surgical environment. The display may be located in the operating room or remote from the operating room. AR devices are worn on the head of the surgeon or other operating room personnel and typically include two stereo-display lenses or screens, including one for each eye of the user. Natural light is permitted to pass through the two transparent or semi-transparent display lenses such that aspects of the real environment are visible while also projecting light to make virtual objects visible to the user of the AR device.

Two or more displays and AR devices may be used in a coordinated manner, for example with a first display or AR device controlling one or more additional displays or AR devices in a system with defined roles. For example, when activating display or an AR device, a user may select a role (e.g., surgeon, surgical assistant, nurse, etc., during a surgical procedure) and the display or AR device may display information relevant to that role. For example, a surgical assistant may have a virtual representation of an instrument displayed that the surgeon needs to perform for a next step of a surgical procedure. A surgeon's focus on the current step may see different information displayed than the surgical assistant.

Although there are many known onscreen displays and alerts, this disclosure provides many new and unique augmented reality interactive experiences during a surgical procedure. Such augmented reality interactive experiences include visual, auditory, haptic, somatosensory, olfactory, or other sensory feedback information to the surgical team inside or outside the operating room. The virtual feedback information overlaid onto the real world surgical environment may be provided to an operating room (OR) team, including personnel inside the OR including, without limitation, the operating surgeon, assistants to the surgeon, a scrub person, an anesthesiologist and a circulating nurse, among others, for example. The virtual feedback information can be communicated on any number of display options such as a primary OR screen display, an AR device, the energy or surgical stapler instrument, a tablet, augmented reality glasses, device etc.

FIG. 1 depicts a computer-implemented interactive surgical system 1 that includes one or more surgical systems 2 and a cloud-based system 4. The cloud-based system 4 may include a remote server 13 coupled to a storage device 5. Each surgical system 2 includes at least one surgical hub 6 in communication with the cloud 4. For example, the surgical system 2 may include a visualization system 8, a robotic system 10, and handheld intelligent surgical instruments 12, each configured to communicate with one another and/or the hub 6. In some aspects, a surgical system 2 may include an M number of hubs 6, an N number of visualization systems 8, an O number of robotic systems 10, and a P number of handheld intelligent surgical instruments 12, where M, N, O, and P are integers greater than or equal to one. The computer-implemented interactive surgical system 1 may be configured to provide an augmented reality interactive experience during a surgical procedure as described herein.

Figure 2:
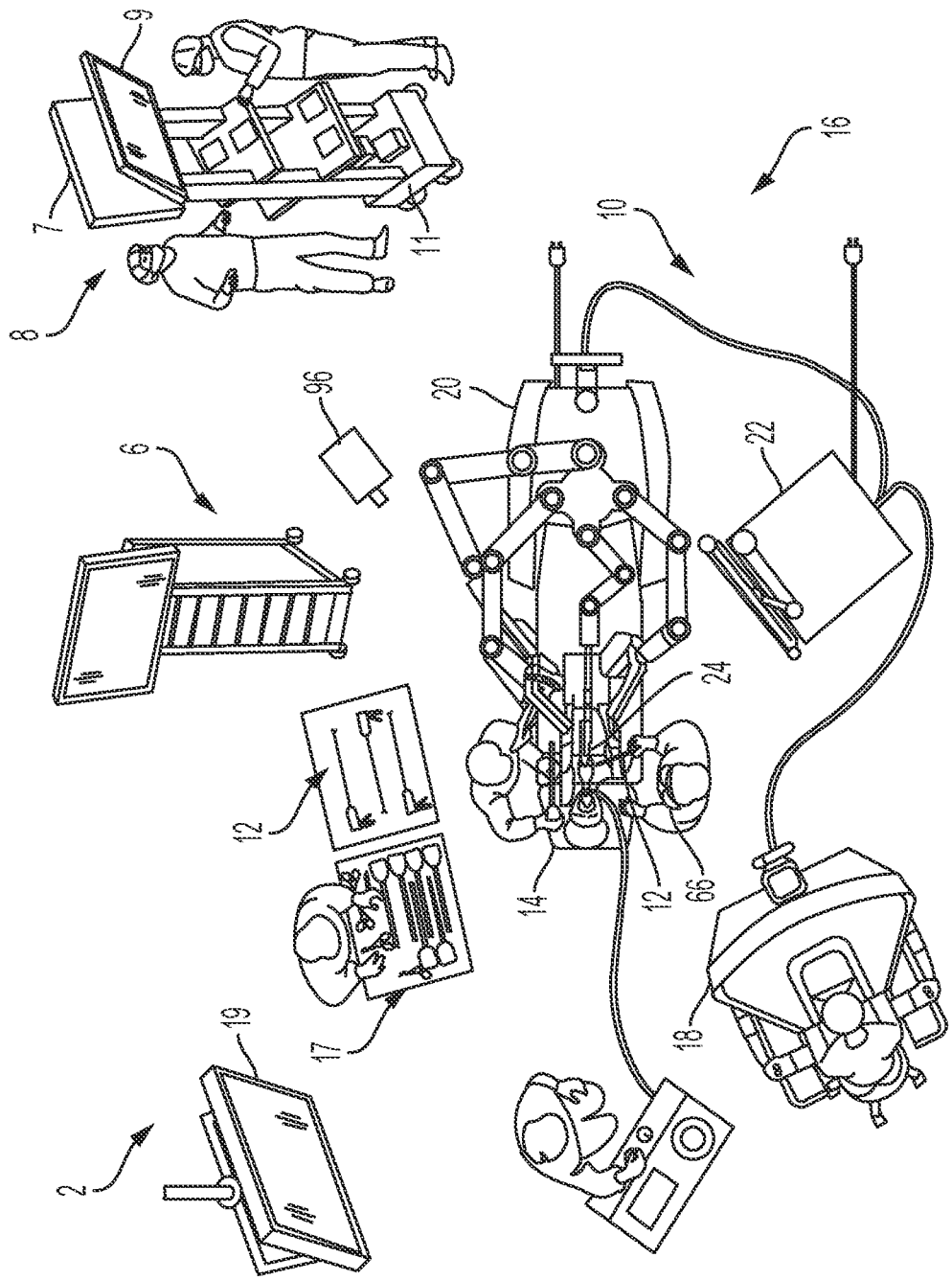
FIG. 2 is a surgical system being used to perform a surgical procedure in an operating room, according to one aspect of this disclosure.

FIG. 2 depicts an example of a surgical system 2 to perform a surgical procedure on a patient lying down on an operating table 14 in a surgical operating room 16. A robotic system 10 is used in the surgical procedure as a part of the surgical system 2. The robotic system 10 includes a surgeon's console 18, a patient side cart 20 (surgical robot), and a surgical robotic hub 22. The patient side cart 20 can manipulate at least one removably coupled surgical tool 17 through a minimally invasive incision in the body of the patient while the surgeon views the surgical site through the surgeon's console 18 or an augmented reality (AR) device 66 worn by the surgeon. An image (e.g., still or live streamed in real time) of the surgical site during a minimally invasive procedure can be obtained by a medical imaging device 24. The patient side cart 20 can manipulate the imaging device 24 to orient the imaging device 24. An image of an open surgical procedure can be obtained by a medical imaging device 96. The robotic hub 22 processes the images of the surgical site for subsequent display on the surgeon's console 18 or the AR device 66 worn by the surgeon, or other person in the surgical operating room 16.

The optical components of the imaging device 24, 96 or AR device 66 may include one or more illumination sources and/or one or more lenses. The one or more illumination sources may be directed to illuminate portions of the surgical field. One or more image sensors may receive light reflected or refracted from tissue and instruments in the surgical field.

In various aspects, the imaging device 24 is configured for use in a minimally invasive surgical procedure. Examples of imaging devices suitable for use with this disclosure include, but not limited to, an arthroscope, angioscope, bronchoscope, choledochoscope, colonoscope, cytoscope, duodenoscope, enteroscope, esophagogastro-duodenoscope (gastroscope), endoscope, laryngoscope, nasopharyngo-neproscope, sigmoidoscope, thoracoscope, and ureteroscope. In various aspects, the imaging device 96 is configured for use in an open (invasive) surgical procedure.

In various aspects, the visualization system 8 includes one or more imaging sensors, one or more image-processing units, one or more storage arrays, and one or more displays that are strategically arranged with respect to the sterile field. In one aspect, the visualization system 8 includes an interface for HL7, PACS, and EMR. In one aspect, the imaging device 24 may employ multi-spectrum monitoring to discriminate topography and underlying structures. A multispectral image captures image data within specific wavelength ranges in the electromagnetic spectrum. Wavelengths are separated by filters or instruments sensitive to particular wavelengths, including light from frequencies beyond the visible light range, e.g., IR and ultraviolet. Spectral imaging can extract information not visible to the human eye. Multi-spectrum monitoring can relocate a surgical field after a surgical task is completed to perform tests on the treated tissue.

FIG. 2 depicts a primary display 19 positioned in the sterile field to be visible to an operator at the operating table 14. A visualization tower 11 is positioned outside the sterile field and includes a first non-sterile display 7 and a second non-sterile display 9, which face away from each other. The visualization system 8, guided by the hub 6, is configured to utilize the displays 7, 9, 19 to coordinate information flow to operators inside and outside the sterile field. For example, the hub 6 may cause the visualization system 8 to display AR images of the surgical site, as recorded by an imaging device 24, 96 on a non-sterile display 7, 9, or through the AR device 66, while maintaining a live feed of the surgical site on the primary display 19 or the AR device 66. The non-sterile display 7, 9 can permit a non-sterile operator to perform a diagnostic step relevant to the surgical procedure, for example.

Figure 3:
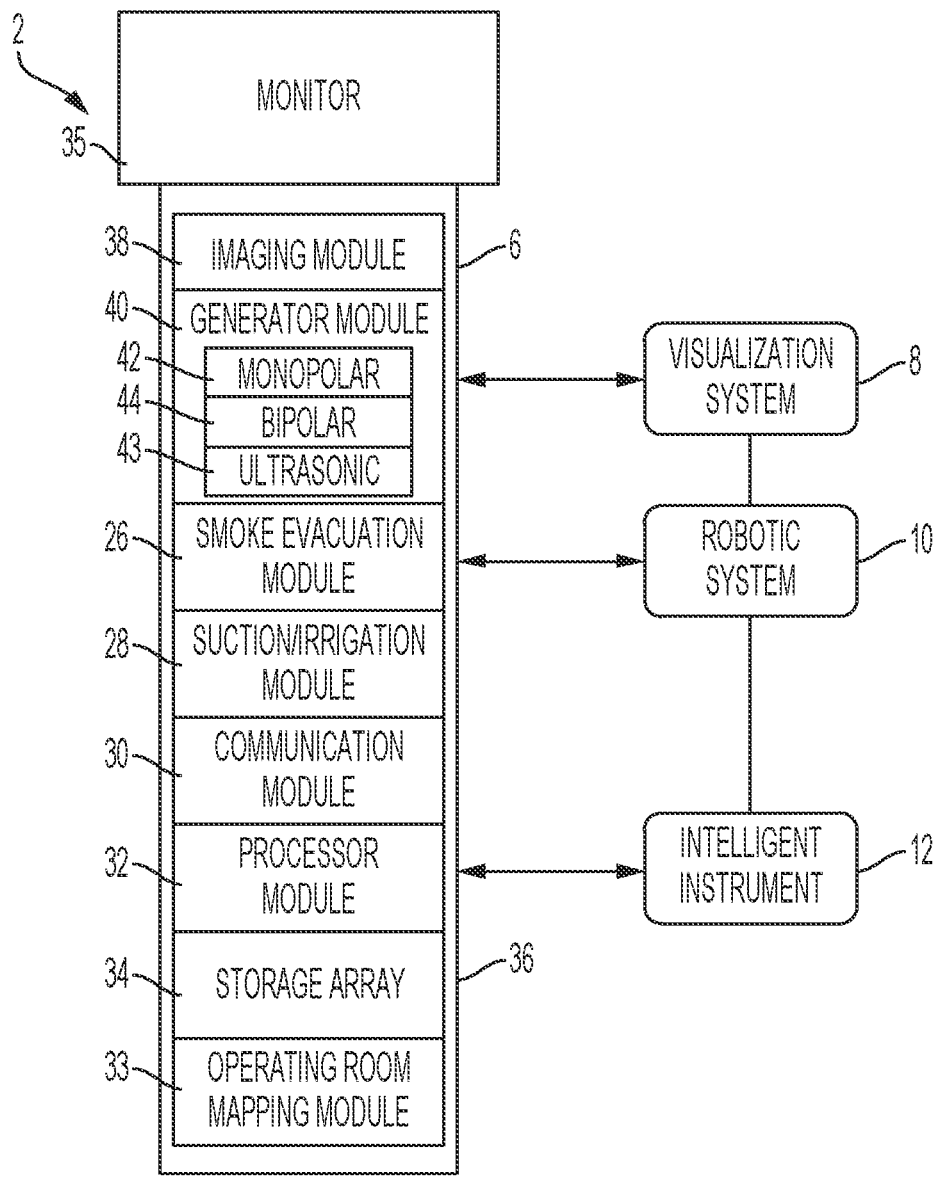
FIG. 3 is a surgical hub paired with a visualization system, a robotic system, and an intelligent instrument, according to one aspect of this disclosure.
Figure 10:
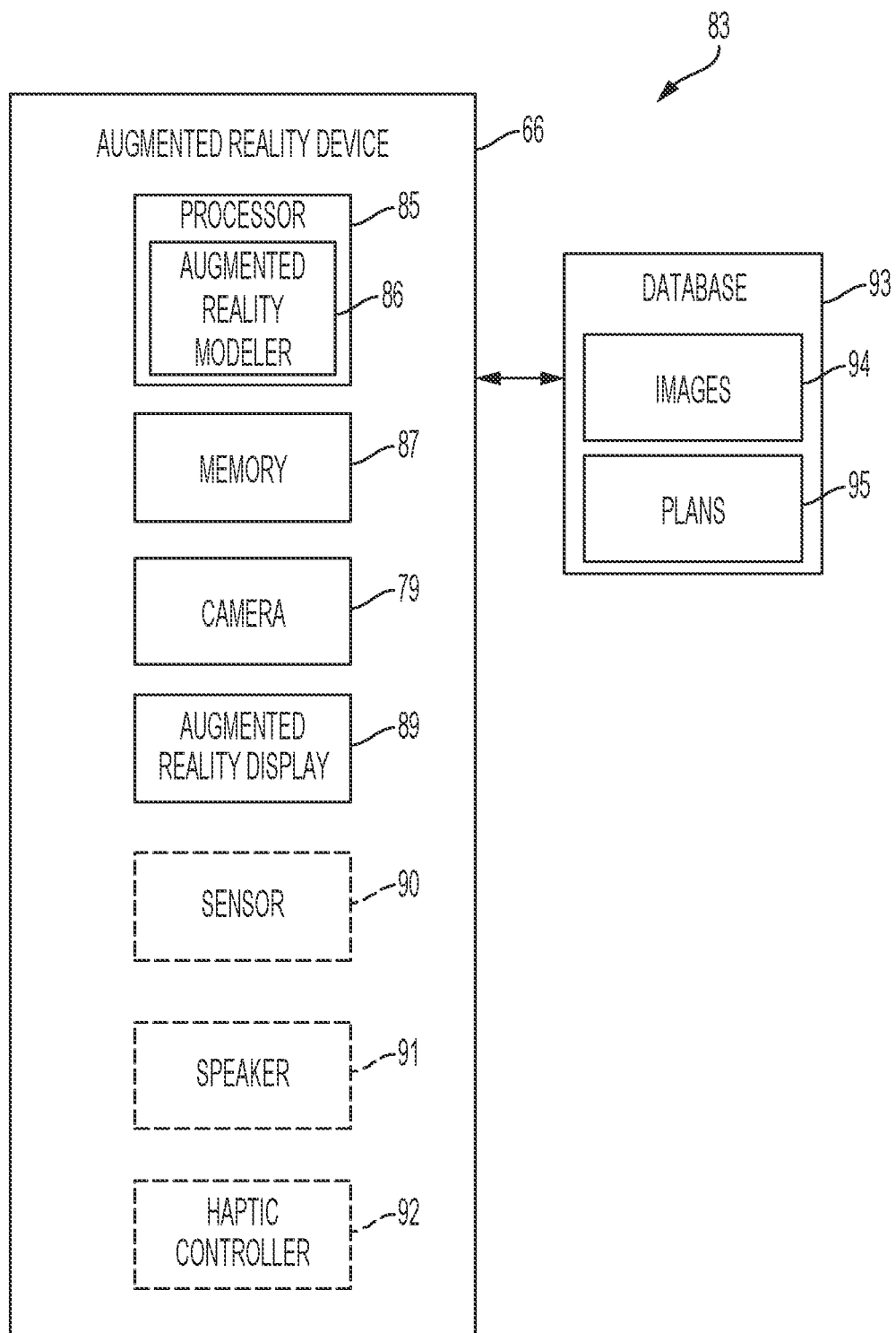
FIG. 10 illustrates a system for augmenting surgical instrument information using an augmented reality display, according to one aspect of this disclosure.

FIG. 3 depicts a hub 6 in communication with a visualization system 8, a robotic system 10, and a handheld intelligent surgical instrument 12. The hub 6 includes a hub display 35, an imaging module 38, a generator module 40, a communication module 30, a processor module 32, a storage array 34, and an operating room mapping module 33. The hub 6 further includes a smoke evacuation module 26 and/or a suction/irrigation module 28. In various aspects, the imaging module 38 comprises an AR device 66 and the processor module 32 comprises an integrated video processor and an augmented reality modeler (e.g., as shown in FIG. 10). A modular light source may be adapted for use with various imaging devices. In various examples, multiple imaging devices may be placed at different positions in the surgical field to provide multiple views (e.g., non-invasive, minimally invasive, invasive or open surgical procedures). The imaging module 38 can be configured to switch between the imaging devices to provide an optimal view. In various aspects, the imaging module 38 can be configured to integrate the images from the different imaging devices and provide an augmented reality interactive experience during a surgical procedure as described herein.

Figure 4:
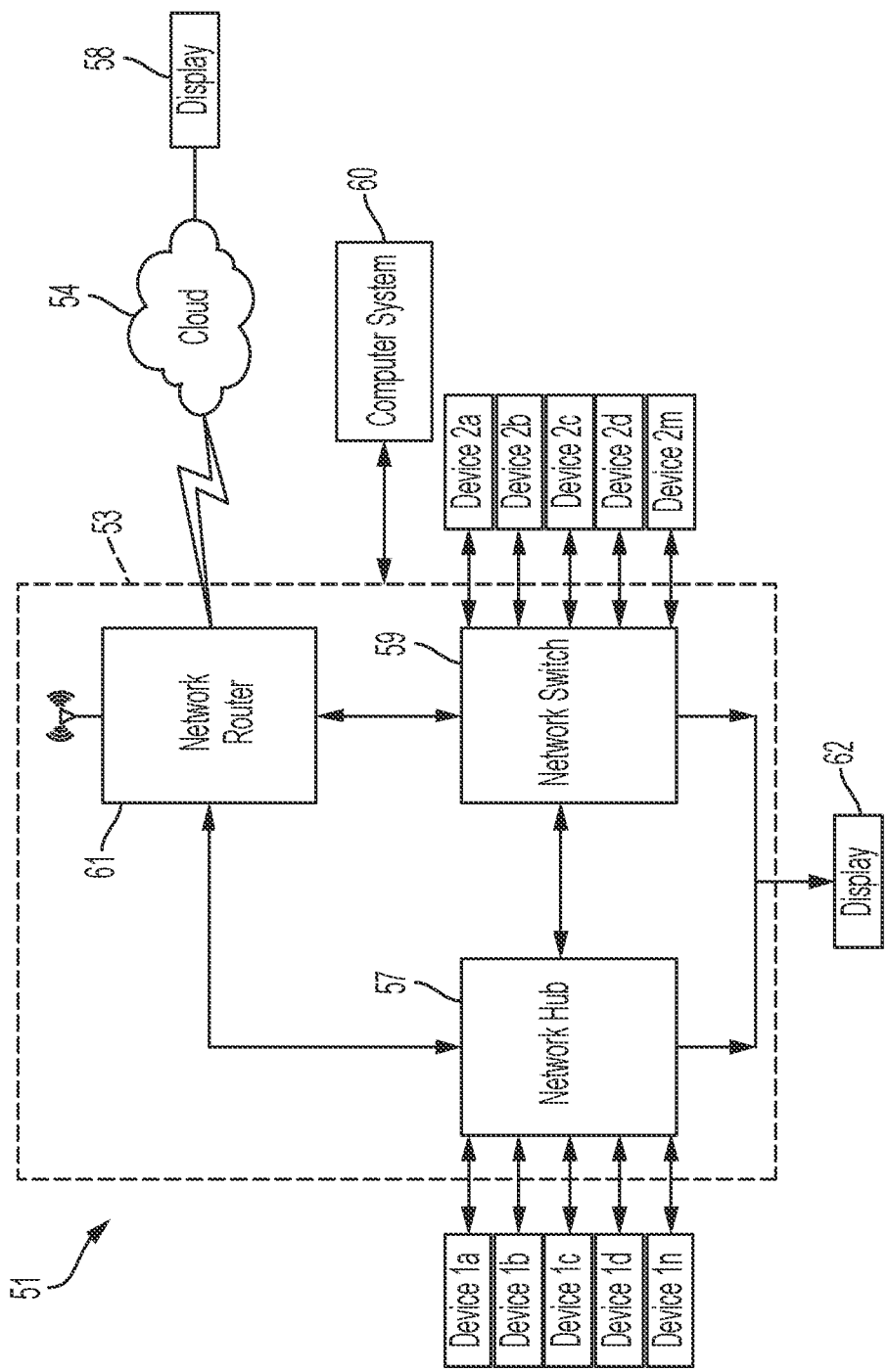
FIG. 4 illustrates a surgical data network comprising a modular communication hub configured to connect modular devices located in one or more operating theaters of a healthcare facility, or any room in a healthcare facility specially equipped for surgical operations, to the cloud, according to one aspect of this disclosure.

FIG. 4 shows a surgical data network 51 comprising a modular communication hub 53 configured to connect modular devices located in one or more operating theaters/rooms of a healthcare facility to a cloud-based system. The cloud 54 may include a remote server 63 (FIG. 5) coupled to a storage device 55. The modular communication hub 53 comprises a network hub 57 and/or a network switch 59 in communication with a network router 61. The modular communication hub 53 is coupled to a local computer system 60 to process data. Modular devices 1a-1n in the operating theater may be coupled to the modular communication hub 53. The network hub 57 and/or the network switch 59 may be coupled to a network router 61 to connect the devices 1a-1n to the cloud 54 or the local computer system 60. Data associated with the devices 1a-1n may be transferred to cloud-based computers via the router for remote data processing and manipulation. The operating theater devices 1a-1n may be connected to the modular communication hub 53 over a wired channel or a wireless channel. The surgical data network 51 environment may be employed to provide an augmented reality interactive experience during a surgical procedure as described herein and in particular providing augmented images if the surgical field to one or more than one remote display 58.

Figure 5:
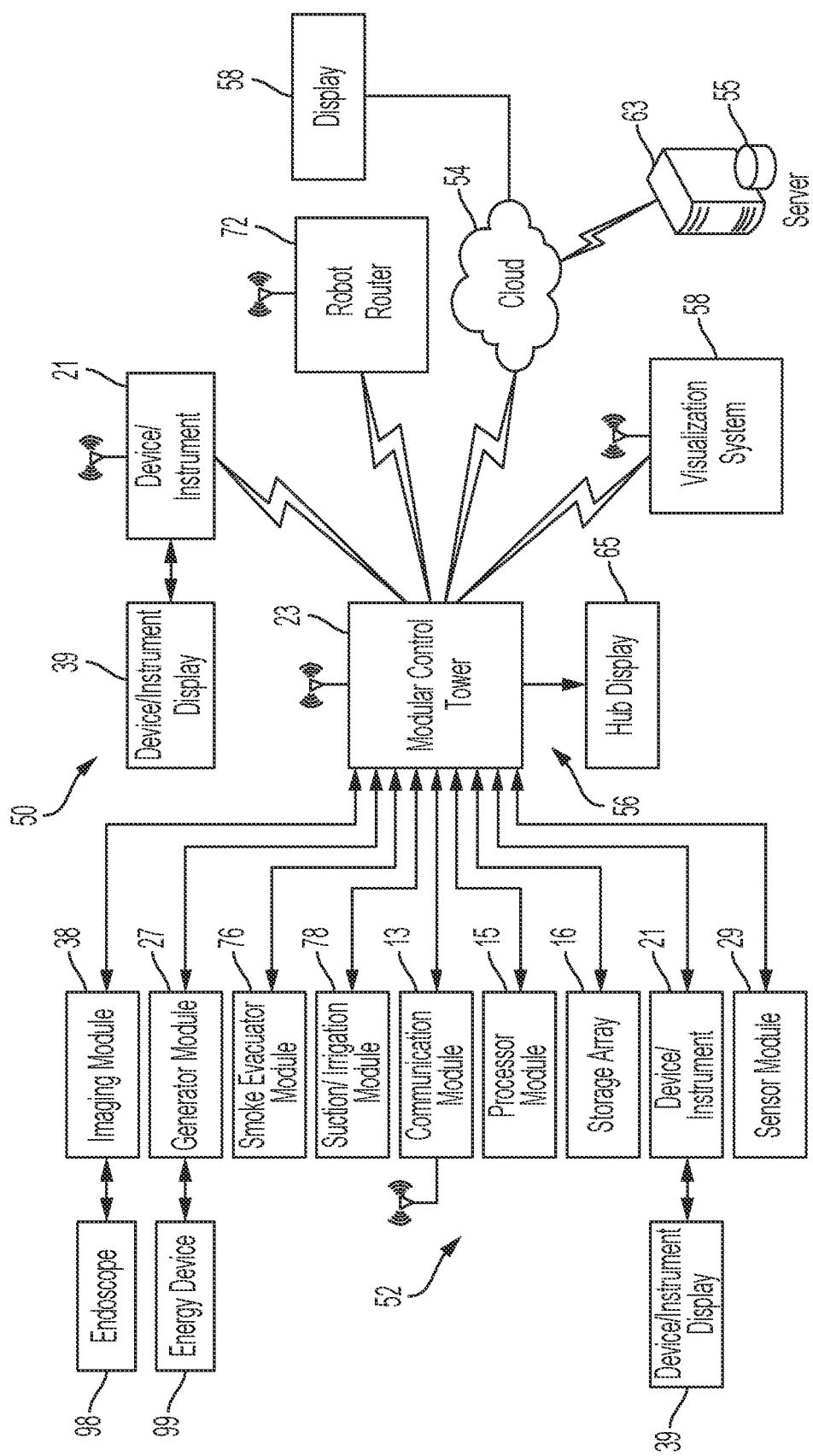
FIG. 5 illustrates a computer-implemented interactive surgical system, according to one aspect of this disclosure.
Figure 6:
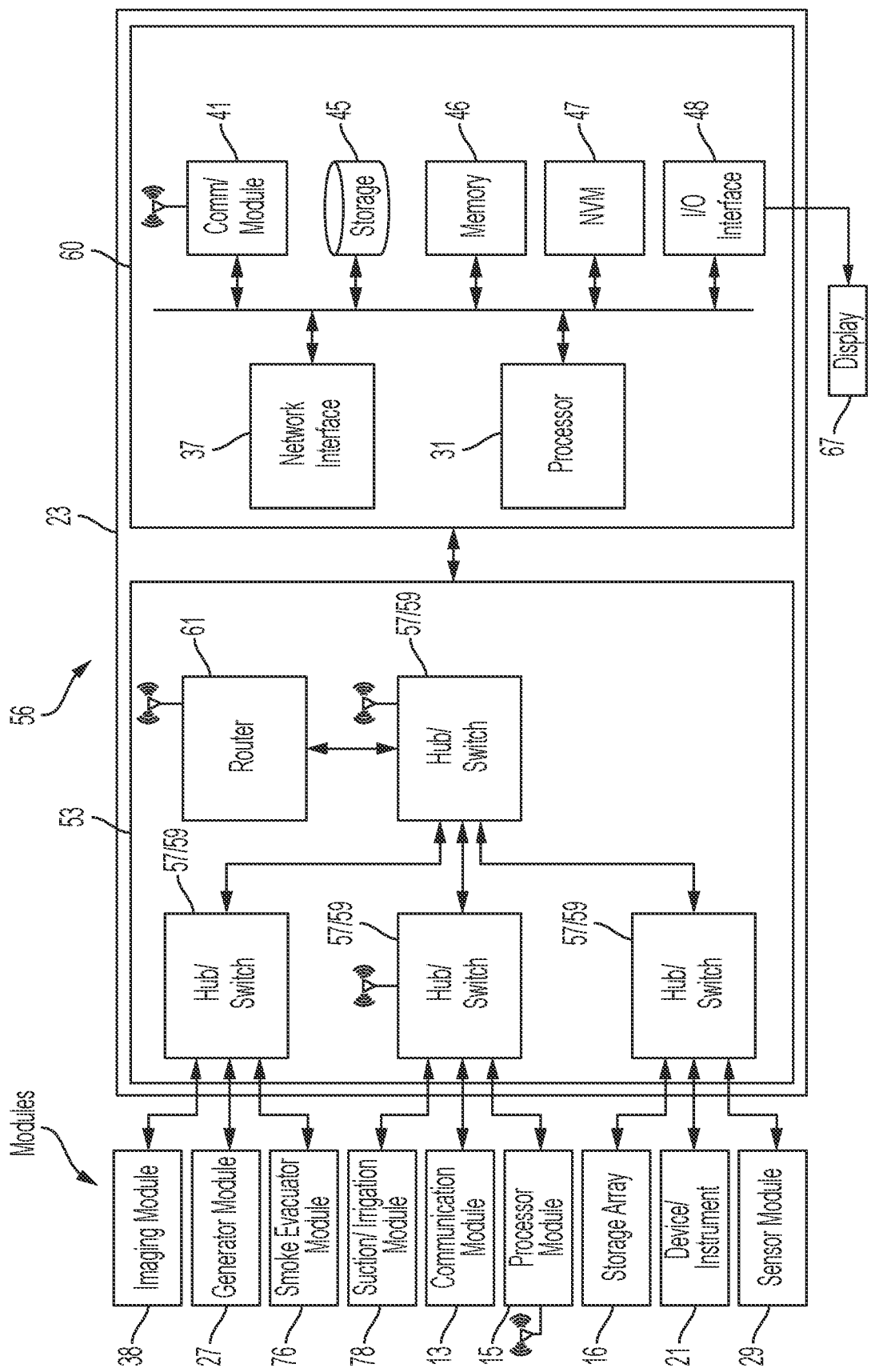
FIG. 6 illustrates a surgical hub comprising a plurality of modules coupled to the modular control tower, according to one aspect of this disclosure.

FIG. 5 illustrates a computer-implemented interactive surgical system 50. The computer-implemented interactive surgical system 50 is similar in many respects to the computer-implemented interactive surgical system 1. The computer-implemented interactive surgical system 50 includes one or more surgical systems 52, which are similar in many respects to the surgical systems 2. Each surgical system 52 includes at least one surgical hub 56 in communication with a cloud 54 that may include a remote server 63. In one aspect, the computer-implemented interactive surgical system 50 comprises a modular control tower 23 connected to multiple operating theater devices such as, for example, intelligent surgical instruments, robots, and other computerized devices located in the operating theater. As shown in FIG. 6, the modular control tower 23 comprises a modular communication hub 53 coupled to a computer system 60.

Back to FIG. 5, the modular control tower 23 is coupled to an imaging module 38 that is coupled to an endoscope 98, a generator module 27 that is coupled to an energy device 99, a smoke evacuator module 76, a suction/irrigation module 78, a communication module 13, a processor module 15, a storage array 16, a smart device/instrument 21 optionally coupled to a display 39, and a sensor module 29. The operating theater devices are coupled to cloud computing resources such as server 63, data storage 55, and displays 58 via the modular control tower 23. A robot hub 72 also may be connected to the modular control tower 23 and to the servers 63, data storage 55, and displays 58. The devices/instruments 21, visualization systems 58, among others, may be coupled to the modular control tower 23 via wired or wireless communication standards or protocols, as described herein. The modular control tower 23 may be coupled to a hub display 65 (e.g., monitor, screen) to display augmented images received comprising overlaid virtual objects on the real surgical field received from the imaging module 38, device/instrument display 39, and/or other visualization systems 58. The hub display 65 also may display data received from devices connected to the modular control tower 23 in conjunction with images and overlaid images.

FIG. 6 illustrates a surgical hub 56 comprising a plurality of modules coupled to the modular control tower 23. The modular control tower 23 comprises a modular communication hub 53, e.g., a network connectivity device, and a computer system 60 to provide local processing, visualization, and imaging of augmented surgical information, for example. The modular communication hub 53 may be connected in a tiered configuration to expand the number of modules (e.g., devices) that may be connected to the modular communication hub 53 and transfer data associated with the modules to the computer system 60, cloud computing resources, or both. Each of the network hubs/switches 57, 59 in the modular communication hub 53 may include three downstream ports and one upstream port. The upstream network hub/switch 57, 59 is connected to a processor 31 to provide a communication connection to the cloud computing resources and a local display 67. Communication to the cloud 54 may be made either through a wired or a wireless communication channel.

The computer system 60 comprises a processor 31 and a network interface 37. The processor 31 is coupled to a communication module 41, storage 45, memory 46, non-volatile memory 47, and input/output interface 48 via a system bus. The system bus can be any of several types of bus structure(s) including the memory bus or memory controller, a peripheral bus or external bus, and/or a local bus using any variety of available bus architectures.

The processor 31 comprises an augmented reality modeler (e.g., as shown in FIG. 10) and may be implemented as a single-core or multicore processor such as those known under the trade name ARM Cortex by Texas Instruments. In one aspect, the processor may be an LM4F230H5QR ARM Cortex-M4F Processor Core, available from Texas Instruments, for example, comprising an on-chip memory of 256 KB single-cycle flash memory, or other non-volatile memory, up to 40 MHz, a prefetch buffer to improve performance above 40 MHz, a 32 KB single-cycle serial random access memory (SRAM), an internal read-only memory (ROM) loaded with StellarisWare® software, a 2 KB electrically erasable programmable read-only memory (EEPROM), and/or one or more pulse width modulation (PWM) modules, one or more quadrature encoder inputs (QEI) analogs, one or more 12-bit analog-to-digital converters (ADCs) with 12 analog input channels, details of which are available for the product datasheet.

The system memory includes volatile memory and non-volatile memory. The basic input/output system (BIOS), containing the basic routines to transfer information between elements within the computer system, such as during start-up, is stored in non-volatile memory. For example, the non-volatile memory can include ROM, programmable ROM (PROM), electrically programmable ROM (EPROM), EEPROM, or flash memory. Volatile memory includes random-access memory (RAM), which acts as external cache memory. Moreover, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The computer system 60 also includes removable/non-removable, volatile/non-volatile computer storage media, such as for example disk storage. The disk storage includes, but is not limited to, devices like a magnetic disk drive, floppy disk drive, tape drive, Jaz drive, Zip drive, LS-60 drive, flash memory card, or memory stick. In addition, the disk storage can include storage media separately or in combination with other storage media including, but not limited to, an optical disc drive such as a compact disc ROM device (CD-ROM), compact disc recordable drive (CD-R Drive), compact disc rewritable drive (CD-RW Drive), or a digital versatile disc ROM drive (DVD-ROM). To facilitate the connection of the disk storage devices to the system bus, a removable or non-removable interface may be employed.

In various aspects, the computer system 60 of FIG. 6, the imaging module 38 and/or visualization system 58, and/or the processor module 15 of FIGS. 4-6, may comprise an image processor, image-processing engine, graphics processing unit (GPU), media processor, or any specialized digital signal processor (DSP) used for the processing of digital images. The image processor may employ parallel computing with single instruction, multiple data (SIMD) or multiple instruction, multiple data (MIMD) technologies to increase speed and efficiency. The digital image-processing engine can perform a range of tasks. The image processor may be a system on a chip with multicore processor architecture.

Figure 7:
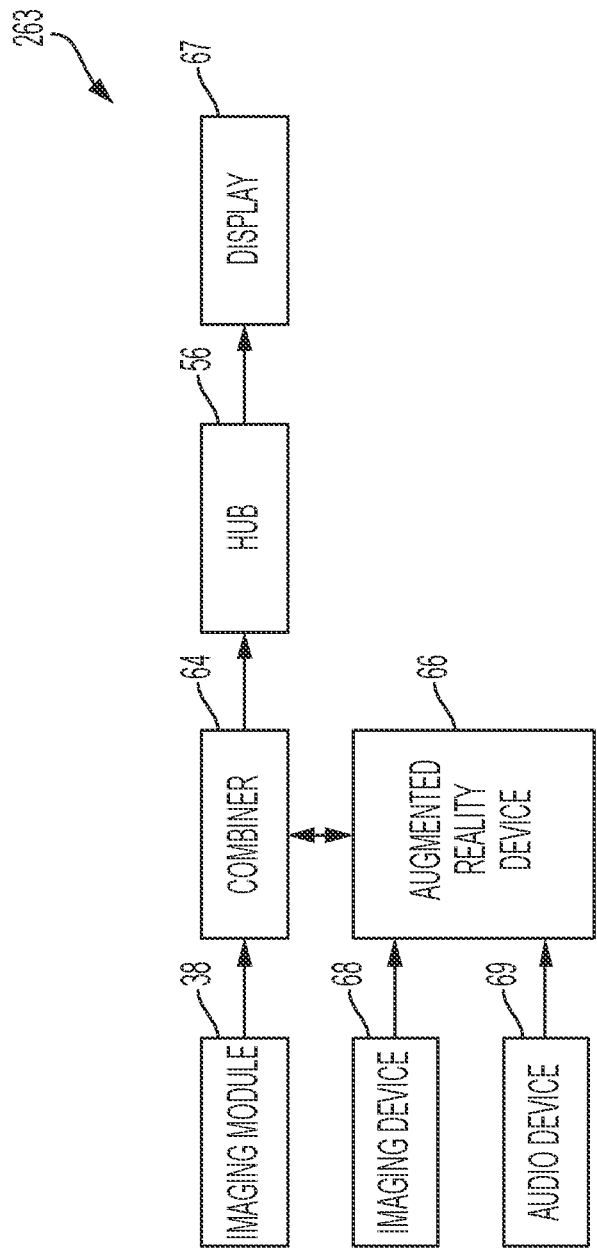
FIG. 7 illustrates an augmented reality system (AR) comprising an intermediate signal combiner positioned in the communication path between an imaging module and a surgical hub display, according to one aspect of this disclosure.

FIG. 7 illustrates an augmented reality system 263 comprising an intermediate signal combiner 64 positioned in the communication path between an imaging module 38 and a surgical hub display 67. The signal combiner 64 combines audio and/or image data received from an imaging module 38 and/or an AR device 66. The surgical hub 56 receives the combined data from the combiner 64 and overlays the data provided to the display 67, where the overlaid data is displayed. The imaging device 68 may be a digital video camera and the audio device 69 may be a microphone. The signal combiner 64 may comprise a wireless heads-up display adapter to couple to the AR device 66 placed into the communication path of the display 67 to a console allowing the surgical hub 56 to overlay data on the display 67.

Figure 8:
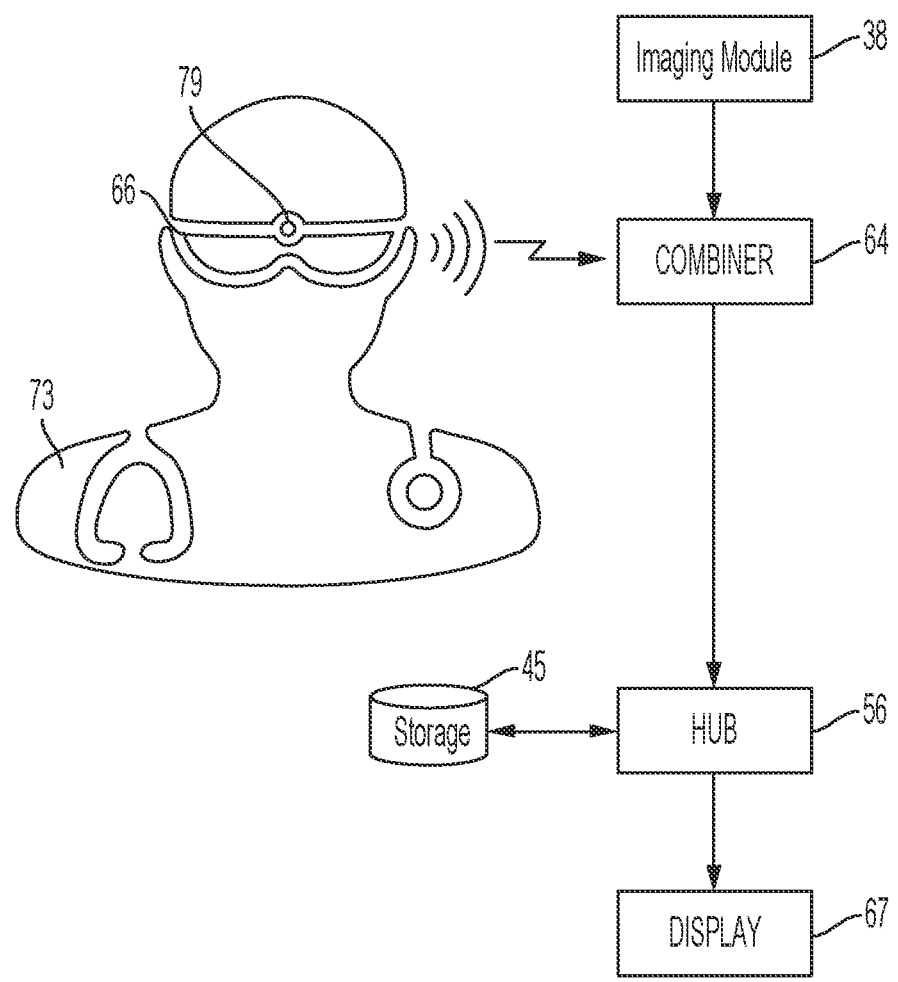
FIG. 8 illustrates an augmented reality (AR) system comprising an intermediate signal combiner positioned in the communication path between an imaging module and a surgical hub display, according to one aspect of this disclosure.

FIG. 8 illustrates an augmented reality (AR) system comprising an intermediate signal combiner positioned in the communication path between an imaging module and a surgical hub display. FIG. 8 illustrates an AR device 66 worn by a surgeon 73 to communicate data to the surgical hub 56. Peripheral information of the AR device 66 does not include active video. Rather, the peripheral information includes only device settings, or signals that do not have same demands of refresh rates. Interaction may augment the surgeon's 73 information based on linkage with preoperative computerized tomography (CT) or other data linked in the surgical hub 56. The AR device 66 can identify structure—ask whether instrument is touching a nerve, vessel, or adhesion, for example. The AR device 66 may include pre-operative scan data, an optical view, tissue interrogation properties acquired throughout procedure, and/or processing in the surgical hub 56 used to provide an answer. The surgeon 73 can dictate notes to the AR device 66 to be saved with patient data in the hub storage 45 for later use in report or in follow up.

The AR device 66 worn by the surgeon 73 links to the surgical hub 56 with audio and visual information to avoid the need for overlays, and allows customization of displayed information around periphery of view. The AR device 66 provides signals from devices (e.g., instruments), answers queries about device settings, or positional information linked with video to identify quadrant or position. The AR device 66 has audio control and audio feedback from the AR device 66. The AR device 66 is able to interact with other systems in the operating theater and have feedback and interaction available wherever the surgeon 73 is viewing. For example, the AR device 66 may receive voice or gesture initiated commands and queries from a surgeon, and the AR device 66 may provide feedback in the form of one or more modalities including audio, visual, or haptic touch.

Figure 9:
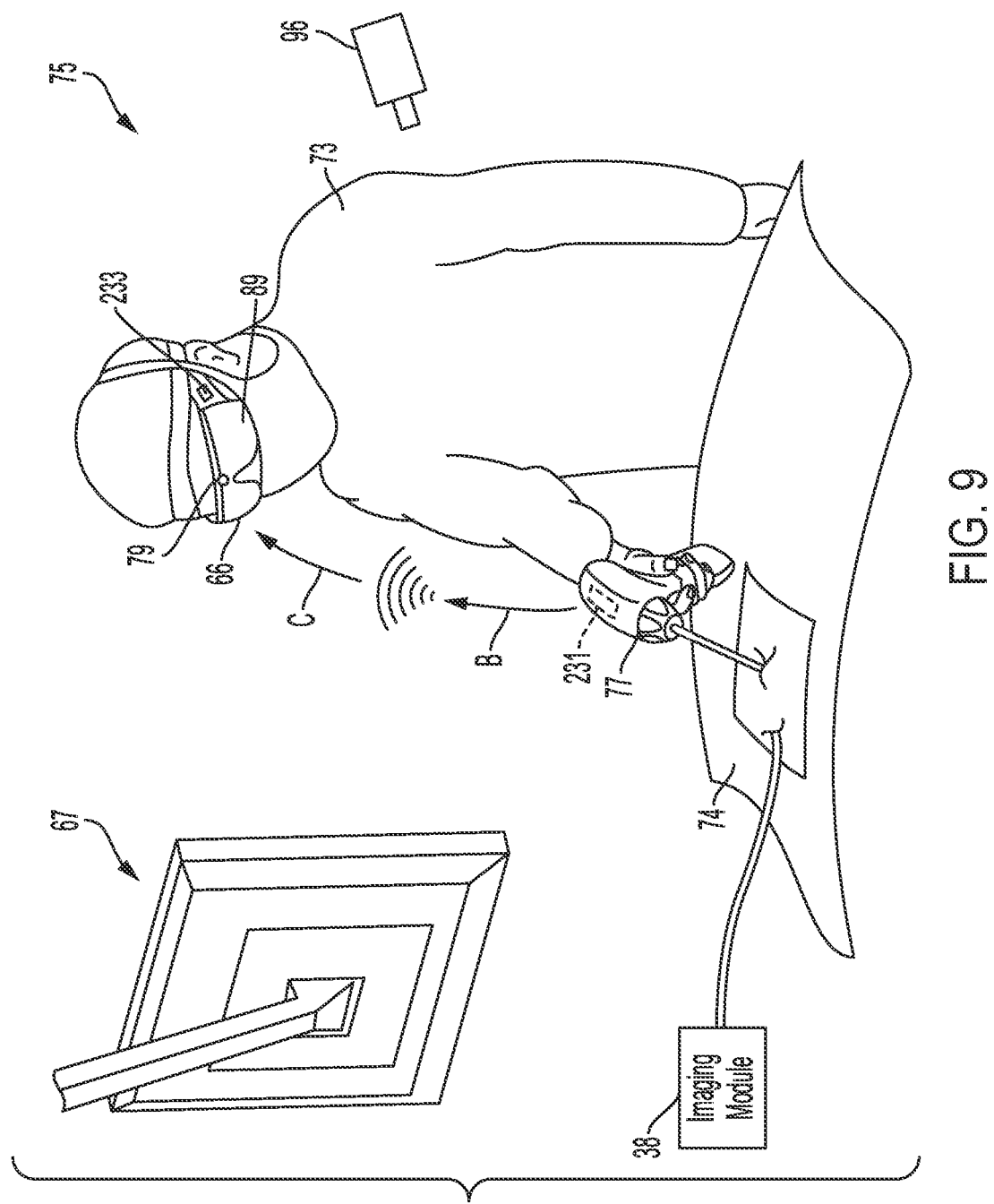
FIG. 9 illustrates an augmented reality (AR) device worn by a surgeon to communicate data to the surgical hub, according to one aspect of this disclosure.

FIG. 9 illustrates a surgeon 73 wearing an AR device 66, a patient 74, and may include a camera 96 in an operating room 75. The AR device 66 worn by the surgeon 73 may be used to present to the surgeon 73 a virtual object overlaid on a real time image of the surgical field through augmented reality display 89 or through the hub connected display 67. The real time image may include a portion of a surgical instrument 77. The virtual object may not be visible to others within the operating room 75 (e.g., surgical assistant or nurse), though they also may wear AR devices 66. Even if another person is viewing the operating room 75 with an AR device 66, the person may not be able to see the virtual object or may be able to see the virtual object in a shared augmented reality with the surgeon 73, or may be able to see a modified version of the virtual object (e.g., according to customizations unique to the surgeon 73) or may see different virtual objects.

A virtual object and/or data may be configured to appear on a portion of a surgical instrument 77 or in a surgical field of view captured by an imaging module 38, an imaging device 68 during minimally invasive surgical procedures, and/or the camera 96 during open surgical procedures. In the illustrated example, the imaging module 38 is a laparoscopic camera that provides a live feed of a surgical area during a minimally invasive surgical procedure. An AR system may present virtual objects that are fixed to a real object without regard to a perspective of a viewer or viewers of the AR system (e.g., the surgeon 73). For example, a virtual object may be visible to a viewer of the AR system inside the operating room 75 and not visible to a viewer of the AR system outside the operating room 75. The virtual object may be displayed to the viewer outside the operating room 75 when the viewer enters the operating room 75. The augmented image may be displayed on the surgical hub display 67 or the augmented reality display 89.

The AR device 66 may include one or more screens or lens, such as a single screen or two screens (e.g., one per eye of a user). The screens may allow light to pass through the screens such that aspects of the real environment are visible while displaying the virtual object. The virtual object may be made visible to the surgeon 73 by projecting light. A virtual object may appear to have a degree of transparency or may be opaque (i.e., blocking aspects of the real environment).

An AR system may be viewable to one or more viewers, and may include differences among views available for the one or more viewers while retaining some aspects as universal among the views. For example, a heads-up display may change between two views while virtual objects and/or data may be fixed to a real object or area in both views. Aspects such as a color of an object, lighting, or other changes may be made among the views without changing a fixed position of at least one virtual object.

A user may see a virtual object and/or data presented in an AR system as opaque or as including some level of transparency. In an example, the user may interact with the virtual object, such as by moving the virtual object from a first position to a second position. For example, the user may move an object with his or her hand. This may be done in the AR system virtually by determining that the hand has moved into a position coincident or adjacent to the object (e.g., using one or more cameras, which may be mounted on the AR device 66, such as AR device camera 79 or separate 96, and which may be static or may be controlled to move), and causing the object to move in response. Virtual aspects may include virtual representations of real world objects or may include visual effects, such as lighting effects, etc. The AR system may include rules to govern the behavior of virtual objects, such as subjecting a virtual object to gravity or friction, or may include other predefined rules that defy real world physical constraints (e.g., floating objects, perpetual motion, etc.). The AR device 66 may include a camera 79 on the AR device 66 (not to be confused with the camera 96, separate from the AR device 66). The AR device camera 79 or the camera 96 may include an infrared camera, an infrared filter, a visible light filter, a plurality of cameras, a depth camera, etc. The AR device 66 may project virtual items over a representation of a real environment, which may be viewed by a user.

The AR device 66 may be used in the operating room 75 during a surgical procedure, for example performed by the surgeon 73 on the patient 74. The AR device 66 may project or display virtual objects, such as a virtual object during the surgical procedure to augment the surgeon's vision. The surgeon 73 may view a virtual object using the AR device 66, a remote controller for the AR device 66, or may interact with a virtual object, for example, using a hand to "interact" with a virtual object or a gesture recognized by the camera 79 of the AR device 66. A virtual object may augment a surgical tool such as the surgical instrument 77. For example, the virtual object may appear (to the surgeon 73 viewing the virtual object through the AR device 66) to be coupled with or remain a fixed distance from the surgical instrument 77. In another example, the virtual object may be used to guide the surgical instrument 77, and may appear to be fixed to the patient 74. In certain examples, a virtual object may react to movements of other virtual or real-world objects in the surgical field. For example, the virtual object may be altered when a surgeon is manipulating a surgical instrument in proximity to the virtual object.

The augmented reality display system imaging device 38 capture a real image of a surgical area during a surgical procedure. An augmented reality display 89, 67 presents an overlay of an operational aspect of the surgical instrument 77 onto the real image of the surgical area. The surgical instrument 77 includes communications circuitry 231 to communicate operational aspects and functional data from the surgical instrument 77 to the AR device 66 via communication communications circuitry 233 on the AR device 66. Although the surgical instrument 77 and the AR device 66 are shown in RF wireless communication between circuits 231, 233 as indicated by arrows B, C, other communication techniques may employed (e.g., wired, ultrasonic, infrared, etc.). The overlay is related to the operational aspect of the surgical instrument 77 being actively visualized. The overlay combines aspects of tissue interaction in the surgical area with functional data from the surgical instrument 77. A processor portion of the AR device 66 is configured to receive the operational aspects and functional data from the surgical instrument 77, determine the overlay related to the operation of the surgical instrument 77, and combine the aspect of the tissue in the surgical area with the functional data from the surgical instrument 77. The augmented images indicate alerts relative to device performance considerations, alerts of incompatible usage, alerts on incomplete capture. Incompatible usage includes tissue out range conditions and tissue incorrectly balanced within the jaws of the end effector. Additional augmented images provide an indication of collateral events including indication of tissue tension and indication of foreign object detection. Other augmented images indicate device status overlays and instrument indication.

FIG. 10 illustrates a system 83 for augmenting images of a surgical field with information using an AR display 89, in accordance with at least one aspect of this disclosure. The system 83 may be used to perform the techniques described hereinbelow, for example, by using the processor 85. The system 83 includes one aspect of an AR device 66 that may be in communication with a database 93. The AR device 66 includes a processor 85, memory 87, an AR display 89, and a camera 79. The AR device 66 may include a sensor 90, a speaker 91, and/or a haptic controller 92. The database 93 may include image storage 94 or preoperative plan storage 95.

The processor 85 of the AR device 66 includes an augmented reality modeler 86. The augmented reality modeler 86 may be used by the processor 85 to create the augmented reality environment. For example, the augmented reality modeler 86 may receive images of the instrument in a surgical field, such as from the camera 79 or sensor 90, and create the augmented reality environment to fit within a display image of the surgical field of view. In another example, physical objects and/or date may be overlaid on the surgical field of view and/or the surgical instruments images and the augmented reality modeler 86 may use physical objects and data to present the augmented reality display of virtual object s and/or data in the augmented reality environment. For example, the augmented reality modeler 86 may use or detect an instrument at a surgical site of the patient and present a virtual object and/or data on the surgical instrument and/or an image of the surgical site in the surgical field of view captured by the camera 79. The AR display 89 may display the AR environment overlaid on a real environment. The display 89 may show a virtual object and/or data, using the AR device 66, such as in a fixed position in the AR environment.

The AR device 66 may include a sensor 90, such as an infrared sensor. The camera 79 or the sensor 90 may be used to detect movement, such as a gesture by a surgeon or other user, that may be interpreted by the processor 85 as attempted or intended interaction by the user with the virtual target. The processor 85 may identify an object in a real environment, such as through processing information received using the camera 79. In other aspects, the sensor 90 may be a tactile, audible, chemical, or thermal sensor to generate corresponding signals that may combined with various data feeds to create the augmented environment. The sensor 90 may include binaural audio sensors (spatial sound), inertial measurement (accelerometer, gyroscope, magnetometer) sensors, environmental sensors, depth camera sensors, hand and eye tracking sensors, and voice command recognition functions.

The AR display 89, for example during a surgical procedure, may present, such as within a surgical field while permitting the surgical field to be viewed through the AR display 89, a virtual feature corresponding to a physical feature hidden by an anatomical aspect of a patient. The virtual feature may have a virtual position or orientation corresponding to a first physical position or orientation of the physical feature. In an example, the virtual position or orientation of the virtual feature may include an offset from the first physical position or orientation of the physical feature. The offset may include a predetermined distance from the augmented reality display, a relative distance from the augmented reality display to the anatomical aspect, or the like.

In one example, the AR device 66 may be an individual AR device. In one aspect, the AR device 66 may be a HoloLens 2 AR device manufactured by Microsoft of Redmond, Wash. This AR device 66 includes a visor with lenses and binaural audio features (spatial sound), inertial measurement (accelerometer, gyroscope, magnetometer), environmental sensors, depth camera, and video camera, hand and eye tracking, and voice command recognition functions. It provides an improved field of view with high resolution by using mirrors to direct waveguides in front of wearer's eyes. Images can be enlarged by changing angles of mirrors. It also provides eye tracking to recognize users and adjust lens widths for specific users.

In another example, the AR device 66 may be a Snapchat Spectacles 3 AR device. This AR device provides the ability to capture paired images and recreate 3D depth mapping, add in virtual effects, and replay 3D videos. The AR device includes two HD cameras to capture 3D photos and videos at 60 fps—while four built-in microphones record immersive, high-fidelity audio. Images from both cameras combine to build out a geometric map of the real world around the user to provide a new sense of depth perception. Photos and videos may be wirelessly synchronized to external display devices.

In yet another example, the AR device 66 may be a Glass 2 AR device by Google. This AR device provides inertial measurement (accelerometer, gyroscope, magnetometer) information overlaid on lens (out of view) to supplement information.

In another example, the AR device 66 may be an Echo Frames AR device by Amazon. This AR device does not have cameras/displays. A microphone and speaker are linked to Alexa. This AR device provides less functionality than a heads-up display.

In yet another example, the AR device 66 may be a Focals AR device by North (Google). This AR device provides notification pusher/smartwatch analog; inertial measurement, screen overlay of information (weather, calendar, messages), voice control (Alexa) integration. This AR device provides basic heads-up display functionality.

In another example, the AR device 66 may be an Nreal AR device. This AR device includes spatial sound, two environmental cameras, a photo camera, IM U (accelerometer, gyroscope), ambient light sensor, proximity sensor functionality. A nebula projects application information on lenses.

In various other examples, the AR device 66 may be any one of the following commercially available AR devices: Magic Leap 1, Epson Moverio, Vuzix Blade AR, ZenFone AR, Microsoft AR glasses prototype, EyeTap to create collinear light to that of the environment directly into the retina. A beam splitter makes the same light seen by the eye available to the computer to process and overlay information, for example. AR visualization systems include HUD, contact lenses, glasses, virtual reality (VR) headsets, virtual retinal display, on in operating room displays, and/or smart contact lenses (bionic lenses).

Multi-user interfaces for the AR device 66 include virtual retinal displays such as raster displays drawn directly on retinas instead of on a screen in front of the eye, smart televisions, smart phones, and/or spatial displays such as Sony spatial display systems.

Other AR technology may include, for example, AR capture devices and software applications, AR creation devices and software applications, and AR cloud devices and software applications. AR capture devices and software applications include, for example, Apple Polycam app, Ubiquity 6 (Mirrorworld using Display.land app)—users can scan and get 3d image of real world (to create 3D model). AR creation devices and software applications include, for example, Adobe Aero, Vuforia, ARToolKit, Google ARCore, Apple ARKit, MAXST, Aurasma, Zappar, Blippar. AR cloud devices and software applications include, for example, Facebook, Google (world geometry, objection recognition, predictive data), Amazon AR Cloud (commerce), Microsoft Azure, Samsung Project Whare, Niantic, Magic Leap.

Device and User Specific Augmented Reality Display

In some aspects, the information displayed by an augmented reality display device may depend on the user and the device being used. In particular, the specific views and overlaid virtual objects depicted in the augmented reality display may be determined based on data specific to the user and data specific to an intelligent medical device. Data specific to the user may includes their experience level with the use of the intelligent medical device along with their specific experience with the current procedure. This data may be incorporated in surgical team member personnel data stored in the cloud system. Data specific to the intelligent medical device may include all relevant manufacturing and model data and history of use. In some aspects, the device specific data may be included in one or more memory devices disposed within the intelligent medical device. In other aspects, the device specific data—such as history of use—may in medical device data stored in the cloud system. The combination of the user specific data and the intelligent medical device specific data may be used to determine the user's level of experience with the device and the proficiency as measured by past uses of the same or a similar device.

In some aspects, based on user/device data, the augmented reality display device can be configured to display the information in a "Training mode". In this mode, the augmented reality virtual objects can include displays or alerts such as safety alerts (for example, possible bleeding, high tissue tension), as well as alerts on suboptimal technique (for example double burns, tissue tagging). The alerts can be specific to the user's assessed skill history and provide guidance where skill needs improvement. For example, a new ultrasonic device user might have a history of overfilling the jaw which might result in incomplete cuts. In some aspects, augmented reality displaying warnings against overfilled jaws may accelerate learning specific to insertion of tissue in the jaw. In contrast, an advanced user might become overconfident and tend to speed up the flow by pulling on the tissue. In such examples, augmented reality displaying warnings on tissue tension may alert on suboptimal technique that might cause bleeding.

The user might be using a competitor's device. The augmented reality interactive surgical system can then display features in a "Sales mode". The sales mode compares the user's use of the competitor's device to a baseline performance with comparable device and displays suggestions such as "This step could be x % faster, with y % less bleeding" if another device was used.

The nature of information displayed by augmented reality display devices may vary according to who is the user of the device. In one aspect, if the user of an intelligent surgical device may be an automated system (a robot), the information displayed by the augmented reality display devices may include general procedural metrics and alerts. In some examples, such procedural metrics and alerts may be displayed in the form of a dashboard that can be read by one or more members of the surgical team. Alternatively, for manual laparoscopic surgery, the augmented reality display may be more granular to the successive steps in the surgical procedure and may specifically relate to structures and operations visible in the surgical field. There may be a gradual progression between these two extremes.

Various forms of information may be entered by the user to the interactive surgical system. For example, the user may enter information via pressure sensors or contact points disposed on an intelligent medical device. For example, activation of these sensors or contact points may indicate that the device is closed. In another aspect, the user may provide warnings to the interactive surgical system by means of hand gestures that may sensed by the interactive surgical system via visualizing devices. These gestures may indicate that a next surgical step should not proceed (for example, that a tissue grasped by a set of jaw should not be cut with a knife).

The augmented reality display system may display information relative to a surgical procedure step, such as a procedure step ID indicator. The interactive surgical system may obtain the information regarding the procedure step from an analysis of images received as video streams from imaging systems (such as from one or more cameras). Artificial intelligence modules disposed in the cloud system may determine the information content based on the images from the camera video stream and the camera originating the video stream. As a result, the interactive surgical system may analyze the video data and display the information relative to the procedure step based on additional analysis using procedure planning software. In some aspects, the augmented reality display may be associated with a specific surgeon's way to perform procedure.

In some aspects, an extension of the user's virtual "location" may be to that of the end of the instrument being manipulated by the user. In additional aspects, the interactive surgical system may cooperatively cause an augmented reality trigger that would occur in the micro space at the end of the instrument when looking at the monitor or surgical site as well as the grosser macro-space of the patient and the equipment surroundings. For example, this may include image scaling from the micro to the macro spaces based on the tracking of where the user is looking. In one non-limiting example, the interactive surgical system may display information related to energy delivery by one intelligent surgical device, but also include information related to a tissue grasper when the grasper comes into the surgical site field of view.

Smart Trocar

Endoscopic tools, such as energy devices, can heat tissue to a temperature where damage can occur upon contact. A method is disclosed to warn the surgeon of high temperature for safe positioning of such energy devices could minimize the risk of tissue damage.

In one aspect, a trocar may be transmissive of infrared radiation. The interactive surgical system may also include a low-cost infrared sensor (either a video sensor or other optical sensor) with particular sensitivity to wavelengths consistent with temperatures that may harm tissue. The trocar would then be paired with the interactive surgical system or visualization system wirelessly. Additionally, the smart trocar could be a source of emergency lighting in the case of a light source failure. Further, the smart trocar may have a high intensity LED, a haptic motor, or a sound emission system (such as a piezoelectric annunciator) to alert the surgeon of the temperature hazard in the absence of a connected visualization system.

In some aspects, the smart trocar may have localization capabilities, to provide its location in the patient to the interactive surgical system. Technologies associated with such localization capabilities may include, without limitations, Bluetooth connectivity, magnetic field, and an infrared beacon.

As disclosed above, the augmented reality display may be adapted to display image and virtual objects consistent with the role and function of the various members of the surgical team. In some aspects, the brightness of a particular virtual object in an augmented reality display may be modulated or change to indicate, for example, a change in priority associated with the information of that virtual object. In another aspect, the change in display or virtual object brightness may be a means to differentiate an active but paused surgical device (capable of being active but currently passive) from active and in-use surgical device by being coupled to the console controllers (movable by a user selected to perform an operation). Thus, for example, an active but paused instrument may have a data display in the augmented reality display but have the reading un-highlighted, grayed or otherwise indicative of the passive or paused state of the instrument. The brightness of overlaid virtual objects associated with each of the multiple intelligent surgical devices may be used to establish which of the multiple intelligent surgical devices are used by the same user. The brightness of overlaid virtual objects associated with each of the multiple intelligent surgical devices may also be used to distinguish transfer of control of an instrument during hand-off during instrument exchanges. The brightness change may be used to track in real time which instruments are being used by a single user.

Methods of Pairing a Device with a User/System

In one aspect, a user may initiate a communication pairing mode between an interactive medical system via a touchscreen disposed on a piece of capital equipment such as a modular energy supply or a hub communication module. The user may then depress one or more actuation devices such as rocker switches or buttons on the medical device to initiate the complementary part of pairing of the medical device with the intelligent medical system. During routine use of the intelligent medical device, these actuation devices may have alternative functions related to the specific operations of the medical device. Once the device is successfully paired, it may trigger user feedback via a haptic buzz and/or an on-screen display of the capital equipment. In one aspect, if the communication pairing is not successful, then the medical device may fail to trigger the haptic buzz, and the interactive medical system may eventually 'timeout' in its search for active devices. The user screen on the capital equipment may prompt the user to press the buttons simultaneously on that medical device in an attempt to initiate or re-initiate communication pairing. In another aspect, the user may push a button on the intelligent medical device and then remove the bailout door. The state of the bailout door may be detected by a Hall affect sensor.

In one aspect, the capital equipment comprising the interactive surgical system may identify multiple smart surgical devices, and the user is prompted with which device they would like to be able to connect. After an initial communication pairing, the surgical device may perform an authentication step which may include any security features needed to validate that the medical device is approved for use with the interactive surgical system.

In another aspect, an intelligent medical device may include an imaging device such as a display screen which could display a pairing code. During an initialization step for communication pairing, the user may enter the pairing code directly into the capital equipment of the interactive surgical system using a touch screen or a keyboard. Alternatively, the user may receive the pairing code on the user's assigned imaging device screen and simply select an icon to 'verify' the communication pairing through any one of a touch screen operation, a mouse click operation, or a keyboard entry operation.

In some aspects, an intelligent medical device may include a gyroscope or three-axis accelerometer to detect changes in the position and/or orientation of the device. The interactive surgical system may prompt the user to perform a series of motions with the medical device (for example, tilt the device forward, back, or similar) to validate the connection between the medical device and the surgical system. Additionally, these actions may be used to validate the integrity of the connection, as well as calibrate the gyroscope and/or accelerometer.

In another aspect, the camera of a laparoscopic device may be used to read a communication pairing code. For example, the user of the laparoscopic device may initiate a communication pairing mode on the interactive surgical system via a touchscreen button. Then, using the laparoscopic camera, the user may direct the camera at a pairing code. The laparoscopic device may then analyze to initiate active pairing between the two devices. In some aspects, the pairing code may be one of a QR code, barcode, a plaintext, an image, or any other visually recognizable mark. It may be understood that the laparoscopic device must be maintained in the sterile field during the visual pairing process. Alternatively, a Bluetooth® or other wireless QR code reader may be used, which may allow more flexibility with the location of the reader. Alternatively, other cameras located within the operating room may be engaged to capture the serial number and pair the intelligent surgical device with the interactive medical system.

In another aspect, an intelligent medical device can form a communication pair with the interactive surgical system via a near field communication ("NFC) reader/pick-up coil that is incorporated into a reusable grounding pad. In yet another aspect, communication between the interactive surgical system and the intelligent surgical device may be accomplished with the use of infra red communication means.

In some alternative aspects, a communication pairing code may be physically incorporate on a bulkhead of the interactive surgical system or on the intelligent medical device. Such physical incorporation may include a sticker displaying the pairing code, or the pairing code may be engraved on the body of the interactive surgical system or on the intelligent medical device In another aspect, a communication pairing code may be incorporated in or included with the packaging of the intelligent medical device. An example of the use of such packing associated pairing code may be found in FIG. 11, FIG. 12, and FIG. 13.

Figure 11:
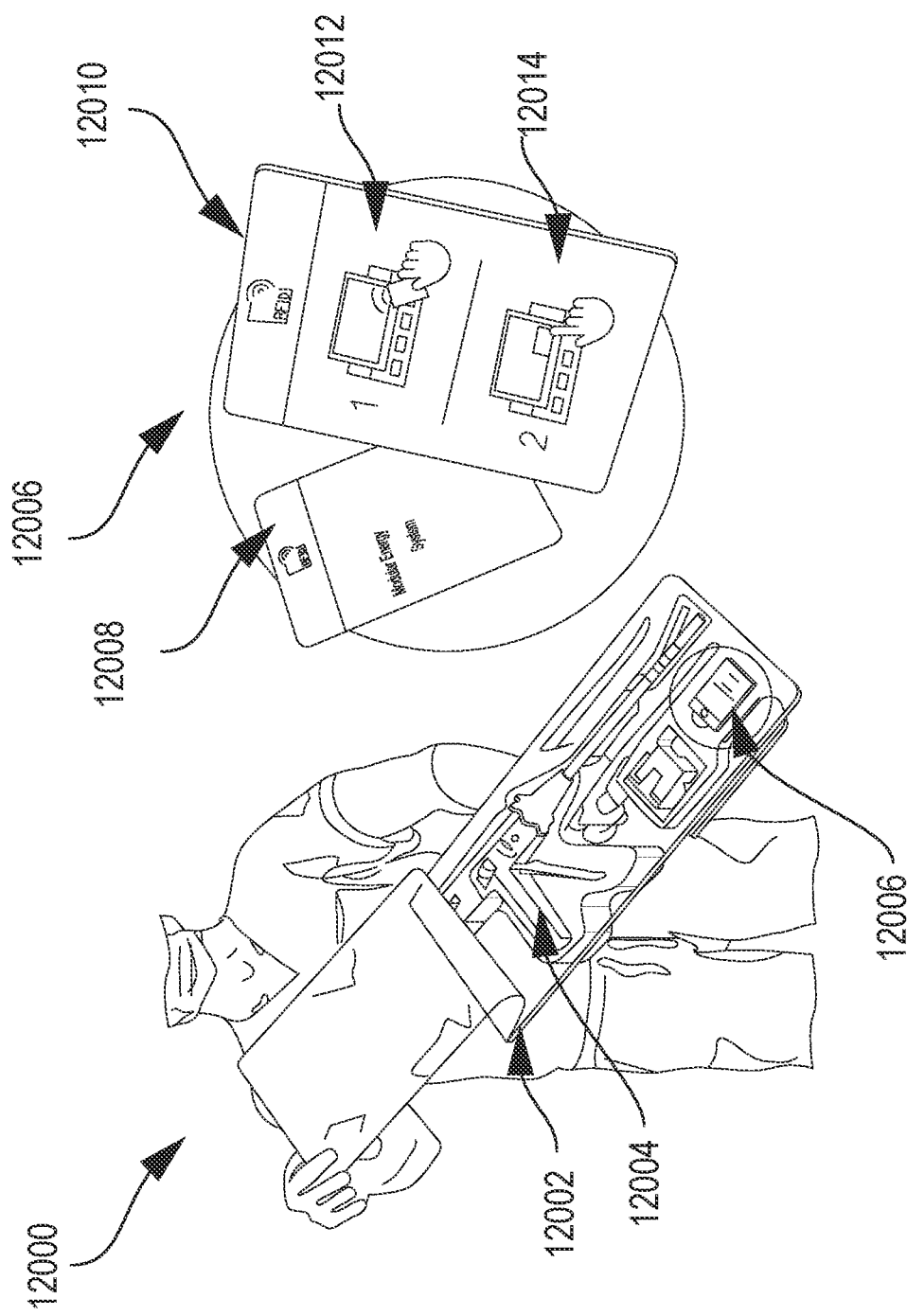
FIG. 11 is a perspective view of a packaging system for a wireless surgical instrument capable of RFID token-based pairing, in accordance with one aspect of the present disclosure.

FIG. 11 is a perspective view of packaging 12000 for a wireless surgical instrument capable of RFID token-based pairing, in accordance with one aspect of the present disclosure. Included within packaging 12000 is a packaging container 12002, a surgical instrument 12004, and an RFID card 12006. Surgical instrument 12004 may be, for example, an ultrasonic surgical instrument, an RF electrosurgical instrument, or a multifunction surgical instrument. Further, RFID card 12006 is unique to surgical instrument 12004. A first side 12008 of RFID card 12006 includes an RFID symbol and an arrow instructing a user to flip the card over to a second side 12010. A second side 12010 of RFID card 12006 includes instructions for wirelessly pairing surgical instrument 12004 to a modular energy system or other component of the interactive surgical system. Specifically, the second side 12008 of RFID card 112006 includes a visual prompt 12012 instructing the user hold the card up to a display screen of a modular system (which has the effect of locating the card proximal to the RFID reader) to initiate pairing and a visual prompt 12014 instructing the user to follow instructions on the display screen to complete pairing.

Figure 12:
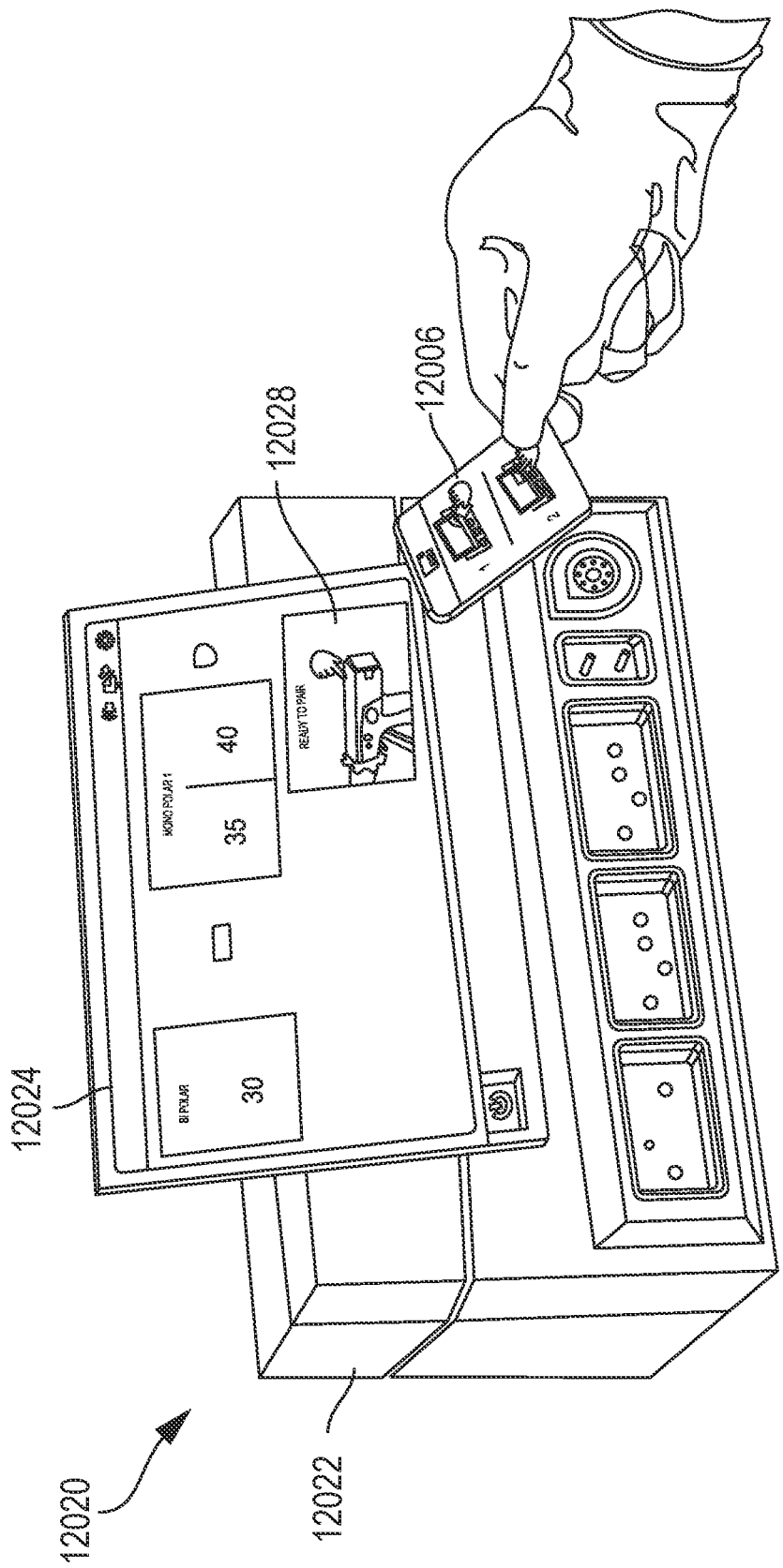
FIG. 12 is a perspective view of a user holding an RFID card proximal to a display screen of a modular energy system to initiate RFID token-based pairing, in accordance with one aspect of the present disclosure.
Figure 13:
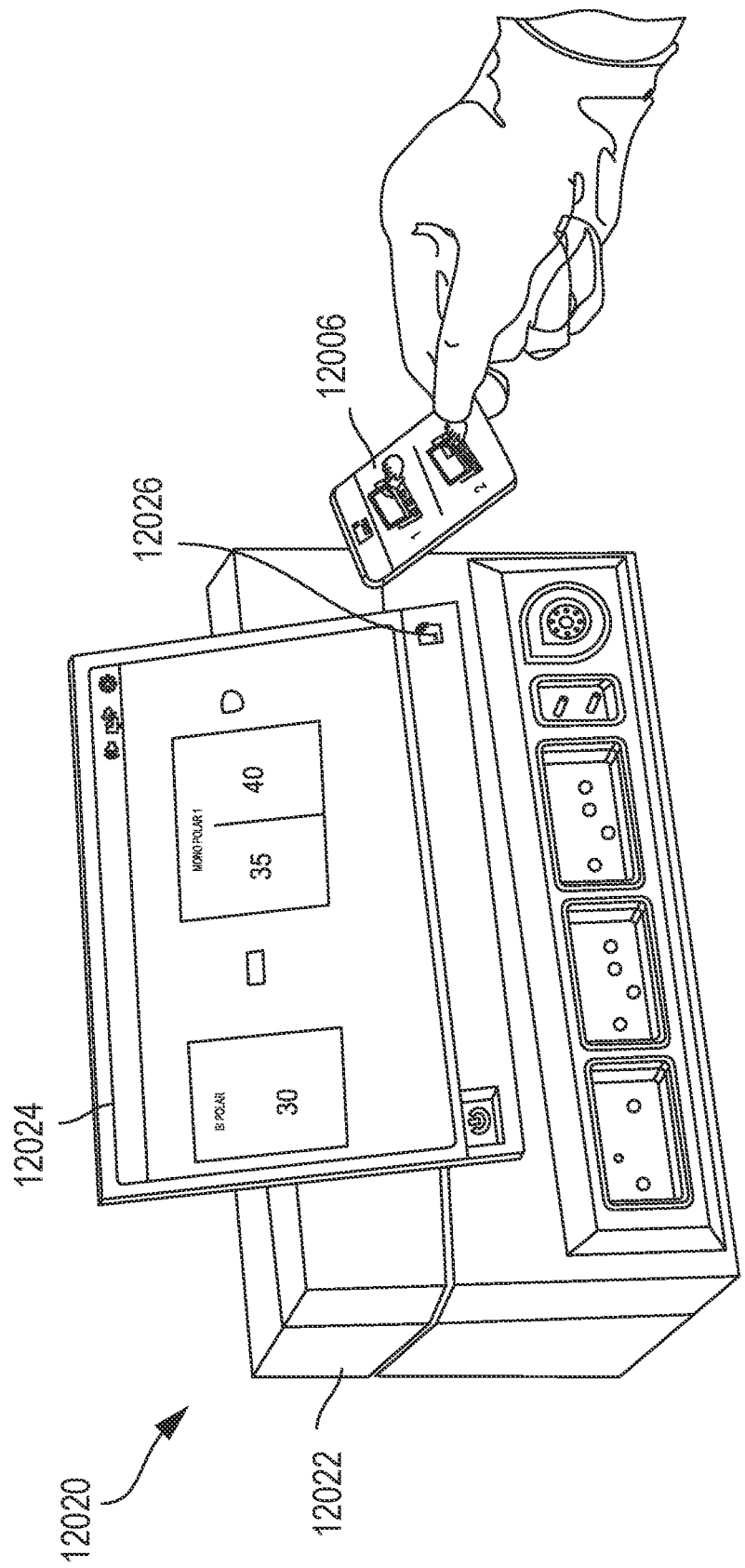
FIG. 13 is a perspective view of a display screen displaying illustrated instructions for wirelessly pairing a surgical instrument to a modular energy system, in accordance with one aspect of the present disclosure.

FIG. 12 is a perspective view of a user holding RFID card 12006 proximal to a display screen 12024 of a modular energy system 12020. The modular energy system 12020 may be incorporated into the interactive surgical system. Further, modular energy system 12020 includes a header module 12022 and a display screen 12024. Display screen 12024 includes an RFID symbol 12026 that indicates the location of the RFID reader. FIG. 13 depicts a user locating RFID card 12006 proximal to RFID symbol 12026. This action causes modular energy system 12020 to begin searching for the surgical instrument 12004 for wireless pairing. This action also causes display screen 12024 to display illustrated instructions for wirelessly pairing surgical instrument 12004 to modular energy system 12020.

FIG. 13 is a perspective view of a display screen 12024 displaying illustrated instructions 12028 for wirelessly pairing surgical instrument 12004 to modular energy system 12020. The illustrated instructions 12028 displayed on the display screen 12024 may prompt the user to press a button on surgical instrument 12004 that causes the instrument to enter a pairing mode. In one aspect, placing surgical instrument 12004 in pairing mode causes it to connect to modular energy system 12020, completing the wireless pairing process. In another aspect, multiple steps may be required to pair surgical instrument 12004 to modular energy system 12020. In this case, illustrated instructions 12028 may prompt the user to complete each of the steps required to pair the instrument.

Aspects of Pairing a Device with a User/System

In some aspects, a technology used for pairing an intelligent surgical device with an interactive surgical system may have additional functions. For example, an intelligent surgical device may be recognized by an interactive surgical system based on a radiofrequency identification (RFID) chip embedded in the device. In addition to providing an identifying token recognized by the system, the RFID chip may also provide data related to the manufacturing status of the device. Such status information may include a serial number, a lot number, or a manufacturing date of the medical device. The RFID chip may also include information related to any flaws or faults in the manufacturing and testing of the intelligent surgical device to indicate that the device is unusable. Such flaws may also be read from the RFID while the surgical device is being processed in the manufacturer's packaging line.

In some aspects, a geofence may be established for a certain functional area in a surgical suite, such as a Mayo stand, a charting table, or the entire Operating Room. Any device that is brought within the geofence area may automatically be paired with any other medical device that is already present within that same geofence area.

In some aspects, an intelligent medical device may automatically be paired with piece of capital equipment when simply brought in proximity thereto. Proximity may be defined based on a signal strength of a communication signal emitted by the surgical device. The signal strength may be used as a mechanism for determining the proximity of the device to the equipment. The capital equipment or other components of the interactive surgical system may pair only with the closest surgical device based on its signal strength. Alternatively, multiple devices may pair with the interactive surgical system, but the devices that are closest to the system components may be prioritized in their communication streams. In some aspects, an intelligent surgical device may reject the pairing process however. In some aspects, the pairing may not be automatic, but may still require an affirmative step by the surgical device user. Thus, the user may be required to issue an acknowledgement or respond to a prompt for additional action.

Although communication pairing between devices is typically accomplished over a wireless communication network, such as Bluetooth®, wired devices may also be suitably paired. For example, the MAC address of a wired device may be stored in an EEPROM on the device. The information from the EEPROM may be read by a pairing device, and then MAC address may be used to establish a secondary wireless Bluetooth® connection. Thus, the wired connection can be used as an indicator to the circuitry when the device is ready to be paired. In one non-limiting example, an energy device may include an additional Bluetooth® enabled processor to allow an auxiliary form of wireless communication. The auxiliary wireless communication may enable certain additional features in addition to those features already available over the wired connection. Such wireless enabled medical devices may still work adequately over the wired connection with interactive surgical systems that lack the additional wireless communication capability. As one example, the MAC address stored in the on board medical device EEPROM may be read by a power generator once the medical device is connected to it. Subsequently, the power generator may then establish the wireless pairing with the medical device.

Indication to Mitigate Confusion of Paired Devices

It has been disclosed above that communication pairing between intelligent devices or an intelligent device and the interactive surgical system may permit close and repeatable control of the devices as well as a means for recording the device actions during a surgical procedure. Further, such communication pairing may permit information sharing among the members of the surgical team. It may be recognized that successful communication pairing is required to obtain these advantages. Therefore, it is necessary to have a mechanism to identify that each communication pairing is accurate and complete, and that improper pairing or the pairing of incorrect instruments may be avoided. Thus, an indication of pairing status to differentiate correct pairing and what devices are paired together is required.

It may be understood that incorrect device communication pairing may cause unintended surgical outcomes, delays in executing the surgical procedures, device lockout (the device does not function) or may result in a change the operation of the device. For example, a smart stapler and/or energy device, operating on its own, may have a defined performance. However, if such a device is paired to the interactive surgical system, it may receive additional feedback data from other devices. Such additional data may allow the smart surgical device to activate advanced performance functions and adjusted its functional algorithms based on the additional feedback. For example, tissue images from a laparoscopic imaging device may be analyzed by the interactive surgical system which can then provide additional details of the tissue type and/or disease state of the tissue to the smart stapler and/or energy device. The additional information may result in a increased or decreased clamping pressure and/or firing speed of the stapler, or a change in power level of the energy device. Additionally, improper communication pairing may alter the automation steps within the procedure plan based on an expected pairing with other devices and/or accessories. Additionally, smart surgical devices that are unable to pair with the rest of the surgical system may default to the control feature to allow the lowest risk of unintended tissue trauma, thereby reducing the optimized outcome of the procedure.

Several types of indicators may be used to notify a member of the surgical team of successful or ineffective communication pairing. Loss of communication pairing and/or registry of a device may occur when a user or system switches devices or device priorities.

In some aspects, an audible or haptic annunciator may be used to indicate the state of communication pairing. For example, a piezo-based speaker may be programmed to beep once when a first surgical device has been paired successfully to a second device. Alternatively, one or several small audible chirps may be used to indicate a successful communication pairing. In one example, a surgical device user may attempt to pair an intelligent surgical device with the interactive surgical system. Once the pairing process has completed, the device may issue three small chirps to signify that the device has completed the pairing process. If the device fails to pair, a different audible signal may be emitted. Such different audible signals may include, for example, a difference in number, frequency, decibel level, and/or tone of the audible signal. In one non-limiting example, the device user may attempt to pair the intelligent surgical device with the interactive surgical system, but the communication pairing was unsuccessful or rejected. The unsuccessfully paired device may emit a long, lower frequency chirp to signify that the pairing was not successful. Alternatively, no audible signal may be emitted by a device that has not successfully paired with another. In another example, a user may attempt to pair an intelligent surgical device, but the device may not have received the pairing command and therefore never entered the pairing mode. The device may therefore not emit any auditory signal since no pairing had been initiated. Different types of audible signals may represent different states of communication pairing. As one example, a chirp may indicate when a successful pairing has occurred, while a haptic buzz to indicate when unsuccessful pairing has occurred. Different auditory signals, or types of auditory signals may be used to indicate unidirectional versus bidirectional device-to-device pairing. In some aspects, communication pairing could use multiple or user selectable indications for each device. In other aspects, several different indicators may be used at the same time to show successful or unsuccessful pairing, such as a combination of a piezo and haptic buzz for acknowledgement of pairing.

In some aspects, a visual indicator may be used to indicate the status of communication pairing between intelligent surgical devices or a device and the interactive surgical system. An example of a visual indicator of communication pairing status may be in the form of an LED that flashes, or changes color when it is confirmed successful pairing. It may be understood that pre-existing device LEDs may be recruited to provide this additional information. For example, pre-existing, but not viewable, LEDs, on a device circuit board may be relocated to be visible to the user. For example, an opaque bailout door on a capital piece of equipment may be made translucent, thereby allowing visibility of the pre-existing LED's inside. In some aspects, multiple pairing devices to an interactive surgical system may be distinguished based on using a series of LEDs to show on the device what number device it is. In some other aspects, multiple color LEDs may be used to signify different states. Thus, different colored LEDs may correspond to the pairing status/number of the device. For example, a specific colored LED may be associated with the communication pairing of a first device, while a second specific colored LED may be associated with a second device. In some alternative aspects, a series of colored dots may indicate if the device is paired or not. The user can then decide if data should be used from a device based on its indicator color. In some aspects, the color associated with the pairing state of a device may correspond to the actual data color. In some aspects, one or more augmented relay displays may display colored virtual objects having the same color as the various LEDs associated with the pairing of the devices. In this manner, multiple members of the surgical team may be made aware of the status of the communication pairings. Each surgical device may have a multi-color LED as does each instrument and control system. The same displayed color may be displayed on mutually paired devices.

In some aspects, a combination of visual signal color and other effects may be used to differentiate the pairing statuses of two intelligent surgical devices or a surgical device and an interactive surgical system. FIG. 14 illustrates a group of visual indicia 12100 and their associated status characteristics. Thus, for example, when pairing mode is initiated, a red LED and a blue LED may flash in an alternating matter. A flashing blue LED may indicate that the receiving mode is in process of connecting, while a solid blue LED may indicate that the receiving mode has connected. Similarly, a flashing red LED may indicate that the transmitting mode is in process of connecting, while a solid red LED may indicate that the transmitting mode has connected. The red or blue LEDs may flash rapidly (around once every 0.5 seconds, as an example) to indicate that no connection has been made, or that the first medical device is actively searching for its communication partner. Additional colors may be used to indicate other statuses. Thus, a yellow LED may be used to indicate that the communication pairing connection is not stable (for example, has low bandwidth). A blinking yellow LED may indicate that the pairing has an error other than bandwidth.

In some aspects, a smart battery pack on an intelligent device may serve as a location to implement the LED functionality for displaying the pairing status. In a related aspect, a light ring on the back of a smart battery pack could be used in this manner. A smart battery pack would not necessarily require buttons for activation. In some examples, a battery powered intelligent surgical device may initiate a pairing process with another device when the battery pack is inserted into the surgical device. The pairing process may be maintained for a fixed amount of time until communication pairing is accomplished, or the device times-out with no response.

As noted above, two medical devices or a medical device and an interactive surgical system may indicate the successful formation of a communication pair. In some aspects, the interactive surgical system may depict an augmented reality display on a display device, in which the augmented reality display may indicate the communication pairing status of the various devices. For example, the interactive surgical system may display a virtual object overlaid on images of paired devices and may also show which devices are currently paired together, for example using color coding. In some aspects, interactive surgical system may request a member of the surgical team to confirm the current pairing as depicted in the augmented reality display. It may be understood that the augmented reality display may be displayed on any of the display devices in the operating room, including a main surgical display, auxiliary surgical display, or displays associate with tablet or laptop computers assigned to individual members of the surgical team.

In some aspects, two devices may not completely form a communication pairing. In other aspects, two devices may form a communication pair in error. In some aspects, the interactive surgical system may initially exclude a device from forming a communication pair if that device does not support footswitch triggering as part of its functions. An augmented reality display may depict an image of the non-triggerable device with a virtual object such as a partially opaque or grayed out overlay. A user would then be aware that such devices are not available for communication pairing. The interactive surgical system could initiate a test to ensure that the surgeon has the correct device that is paired to a foot switch. For example, the interactive surgical system could signal for the person setting the system up to depress the clamping system on the device. The interactive surgical system may decode which device is indicative as being active. The interactive surgical system could then prompt the user to verify if this device is one to have an external triggering control. If yes, the user could depress the foot switch to signal acknowledgement; if no, the interactive surgical system may gray out the current device on the augmented reality display device by using a partially gray virtual object overlay. In one example, an operating room may include a set of footswitches that are wirelessly attached to the interactive surgical system. In addition, there may be a wirelessly connected linear stapler and two energy devices also connected through the surgical system. In some aspects, multiple medical devices may be paired to a single foot petal. Prior to the procedure, all devices may require an initial pairing with the accessories within the system, for example surgical staplers, ultrasound devices, monopolar and bipolar RF energy devices, and accessories foot petals.

In one aspect, during the initial setup of the devices within the operating room, all of the intelligent devices and resources may form predefined communication pairs. In some aspects, communication priority of the device being used is set by the primary active interface with the foot petal. In another aspect, communication priority of the various devices may be determined by structural or hierarchical criteria. Thus, devices used during high risk or critical stages of the surgical procedure may be assigned higher communication priorities. In some aspects, a lead surgeon of the surgical procedure may be identified by one or more cameras disposed throughout the operating room. A device used by or held by the surgeon—and visible in the camera's field of view—may also be assigned a high communication priority based on the importance of the surgeon during the procedure. Alternatively, a device not visible in the camera's field of view may be considered to have a low communication activity or may not even be considered active. In some aspect, the user of the device may select the communication priority for a device based on a priority list of devices. The user may also choose to indicate which device is a primary device. As each surgical item is added to the communication network within the operating room, a user may be required to confirm that it should be paired with one or more other devices in the operating room. Alternatively, as each surgical item is added to the communication network within the operating room, one or more components of the interactive surgical system may determine if a smart surgical device should be paired or not. In some other aspects, communication priority or communication pairing for a given surgical device may be determined by the surgical plan which may be entered into the memory of the interactive surgical device or may be determined by the artificial intelligence module in the cloud system.

In some aspects, all of the instruments used during a surgical procedure may be present within the operating room and form necessary communication pairs during an initiation protocol. In some alternative aspects, new instruments may be brought into the operating room after the procedure has started, and they will need to pair with other devices within the existing communication network. As one example, a new device may need to be brought into the procedure due to a failure of a device currently in use. In some aspects, one or more devices may issue a type of warning to notify the surgical team members that a new device has entered the operating room. Warnings may include visual warnings on one or more medical devices or audio warning on one of more devices. Additionally, a warning may appear as a virtual object displayed on a primary augmented reality display device. The virtual object may be overlaid on an image of the new device. The surgical member who may assume control of the new device may acknowledge the receipt of the warning. As one example, if the new medical device is to be activated by a foot switch—with which it will pair—the surgical team member may touch or activate the foot switch in acknowledgment. Alternatively, a surgical team member may acknowledge a new clamping device by activating the clamping trigger or closing the jaws to acknowledge the device. If the user does not activate or otherwise acknowledge the new device, an alternative may be considered active. In yet another example, a user may acknowledge the receipt of the communication warning by activating an icon on a primary surgical display screen, a control tablet, or generator or device screen. Such activation may include a making a hand gesture, touching a touch active screen, or using a mouse or keyboard for data entry in another device.

Pairing Information Displayed at the Request of the System or User

Information about pairing status between surgical devices or an intelligent surgical device and an interactive surgical system may be displayed on any number of displays or at the request of the interactive surgical system or the user. Communication pairing between devices may be accomplished through wireless (inaudible) signal transmission, for example using the Bluetooth® bandwidth. In alternative aspects, the communication may occur over a high frequency (or radio frequency RF) band. This communication band may be received by capital equipment in the operating room which may be in a frequency band that may not disturb individuals within the operating room.

Figure 15:
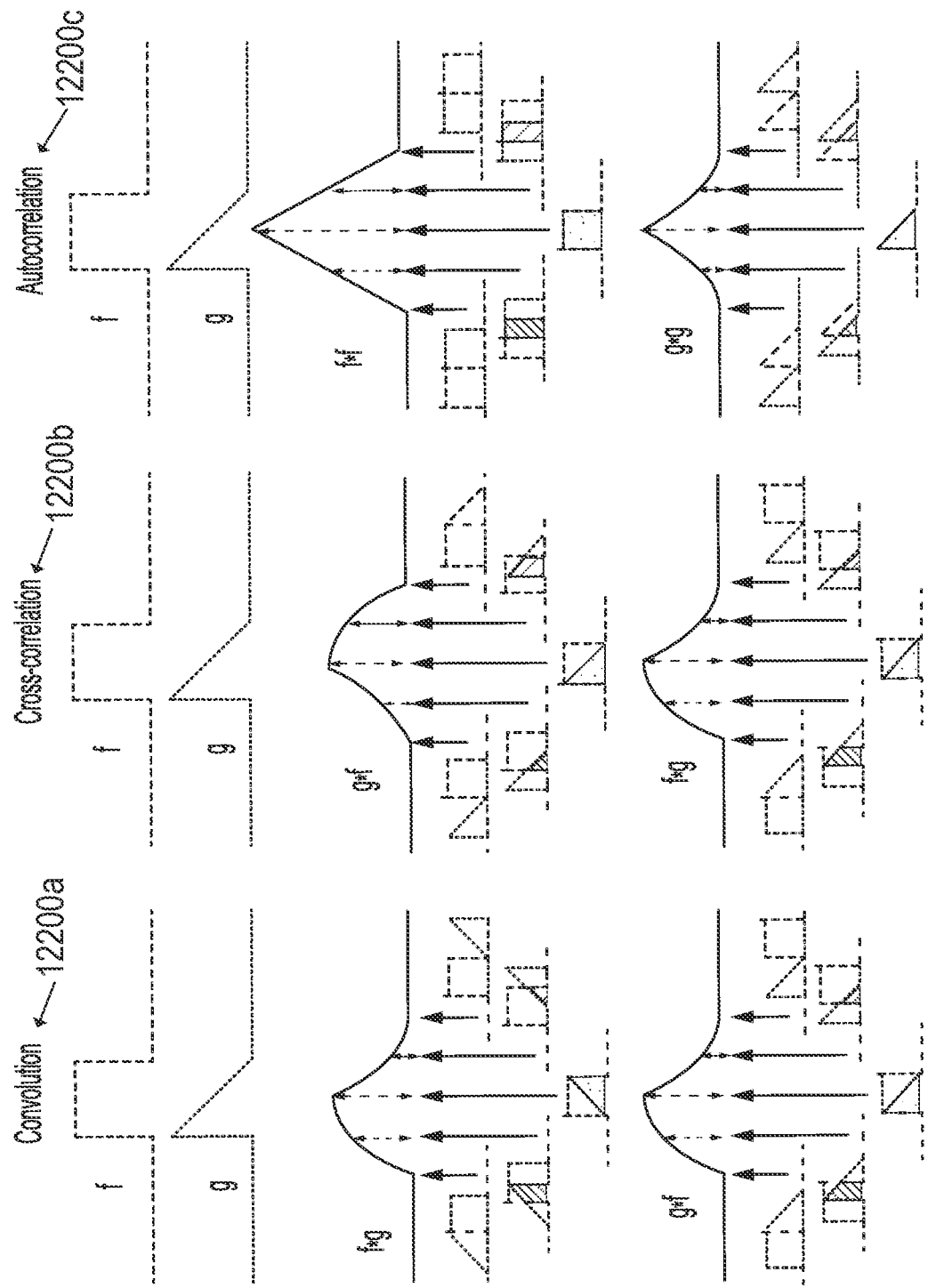
FIG. 15 depicts various mathematical combinations of functions derived from communication initiation syncwords, in accordance with one aspect of the present disclosure.

In some aspects, wireless communication between devices may be initiated by the issuance of a "preamble" or "syncword" by the initiating device. For example, an intelligent surgical device may be powered up and start transmitting its "preamble," which the receiver may cross-correlate or convolute with other signals to identify appropriate devices. Essentially, the transmitter of an intelligent surgical device may emit a wireless fingerprint specific to that device, which has characteristics identifiable by the transceiver. The receiver may use an internal mathematical function to "merge" the preamble signal with another signal in order to identify appropriate transmitters. FIG. 15 depicts how a receiving device may use a convolution function 12200*a*, a cross-correlation function 12200*b*, or an autocorrelation function 12200*c* to identify a particular transmitting surgical device. In some aspects, the initiating or transmitting device may transmit a preamble defined by a function f. In one aspect, the receiving device may store a second pairing syncword function g. The receiving device may then use the appropriate mathematical functions—convolution, cross-correlation, or autocorrelation—on both f and g to obtain resulting functions that may specifically identify the transmitting device.

In some aspects, the transmitted syncword f may include transmitting device identifiable information such as a model number and/or serial number. Alternatively, the syncword f may be a random data string. The transmitter radio may be a hardware defined radio to create a modular platform to randomize the preamble signal. Alternatively, transmitter radio may be a software defined radio to create a modular platform to randomize the preamble signal. Depending on the communication protocol used, the syncwords may be composed of wireless data packets.

In some alternative aspects, the transmitting or initiating device may transmit both the f and g syncwords for the receiving device to decode. In some aspects, the two syncwords may be transmitted using the same carrier frequency. In other aspects, each syncword may be transmitted using a unique carrier frequency. In one example, the initiating device may transmit syncword f over a 2.4 GHz channel, and transmit syncword g over a 5.0 GHz channel. In this example, the receiving device may need multiple physical receivers, each tuned to the appropriate carrier frequency, in order to detect the two syncwords. This particular example suggests that the transmitter and receiver are each tuned to specific carrier frequencies. Alternatively, the transmitter and receiver may each be tuned to specific carrier frequencies bands. In some aspects, each individual type of smart surgical device may be configured or tuned in manufacturing to a specific carrier frequency based on a unique identifier number The use of one or more syncwords or preamble data packets to initiate communication pairing may provide additional information regarding the device attempting to form the communication pair. Additionally, the use of syncwords may improve device communication security. In one aspect, a periodic synchronization key may be embedded within the "preamble" data to add security to wireless communication channel. As an example, within the initial "preamble" message, the transmitter could tell the receiver a new "preamble" will occur after x transmissions or t time. This security measure may prevent preamble decryption as a "listening/sniffing" device may only be able to understand a portion of the message (for example the f preamble or syncword) before having to re-identify the new signal pattern. In this manner, a medical device using a "preamble" to re-initiate appropriate wireless communications for added security. For medical devices that are enabled to receive communication packets within a defined frequency band, the transmitting device may use frequency hopping techniques to mask the synchronization signals.

In some aspects, the transmitting device may combine multiple registers to show what device is able to be connected to. In other aspects, the syncword may be broadcasted on the same service or multiple services, and the device could pair automatically. In some additional aspects, the interactive surgical system may record the series of syncwords transmitted to maintain a record of the communication pairing.

The use of multiple initialization sequences for communication pairing may not be limited to wireless transmission packets. In some aspects, the initialization sequences may be encoded in multiple barcodes or other optically identified markers. For example, a reusable shaft of an intelligent surgical device may have a first bar code inscribed on it, and a disposable end effector (for example a 60 mm end-effector) may have a second barcode engraved on it. The bar codes may be read separately and combined through a mathematical function to result in a single, initialization code.

In some aspects, two devices may be incorrectly or improperly paired. As an example, a robotic procedure could have multiple energy devices and multiple energy generators which both communicate with a control device for example a wireless foot pedal control. The foot pedal could be paired to an incorrect handpiece control for the specific user in control of the foot pedal. In this case, the incorrect wireless device would need to be unpaired from the initial device and then re-paired to the correct device. Additionally, it would also need to provide some indication of what control is paired to what handpiece.

In some aspects, communication pairing may be verified to prevent pairing errors. Pairing errors may be displayed by the augmented reality display device as a virtual object, such as an overlay, on an image of the devices involved. In some aspects, an initial faulty pairing may be severed and re-established if a connectivity error is detected. In some aspects, pairing faults may be recorded and communicated to administrative levels of the surgical system for later analysis. Aspects of such faults may include the nature of the fault, its frequency, and other aspects related to the pairing fault or failure.

In another aspect, a hand-held intelligent surgical device may include a radio frequency identification device (RFID) in its handle. The surgeon using the device may have an RFID reader in the surgical gloves, which may be in communication with the interactive surgical system. In this manner, the surgical system may be made aware of the specific device being handled by the surgeon.

Various additional aspects of the subject matter described herein are set out in the following numbered examples:

Example 1. A method of assessing inter-device communication pairing in a surgical setting, the method including transmitting, by a first intelligent medical device, wireless communication data within the surgical setting, receiving, by a second intelligent medical device, the wireless communication data from the first intelligent medical device, determining, by the second intelligent medical device, communication pairing data indicative of an inter-device communication pairing of the second intelligent medical device with the first intelligent medical device, transmitting, by the second intelligent medical device, the communication pairing data to a modular control tower, and displaying, by the modular control tower on a display device, an augmented reality display comprising one or more virtual objects indicative of the inter-device communication pairing.

Example 2. The method of Example 1, further including indicating, by one or more components of the first intelligent medical device, a status of the inter-device communication pairing with the second intelligent medical device.

Example 3. The method of Example 1, further including indicating, by one or more components of the second intelligent medical device, a status of the inter-device communication pairing with the first intelligent medical device.

Example 4. The method of Example 1, further including displaying, by the modular control tower on the display device, one or more virtual objects indicative of a fault or a conflict in the inter-device communication pairing.

Example 5. The method of Example 4, further including displaying, by the modular control tower on the display device, one or more virtual objects comprising data to resolve the fault or the conflict in the inter-device communication pairing.

Example 6. The method of Example 1, further including displaying, by the modular control tower on a second display device, the augmented reality display comprising the one or more virtual objects indicative of the inter-device communication pairing.

Example 7. The method of Example 1, wherein displaying, by the modular control tower on a display device, an augmented reality display comprising one or more virtual objects indicative of the inter-device communication pairing, includes displaying on a display device associated with a specified member of a surgical team the one or more virtual objects indicative of the inter-device communication pairing.

Example 8. The method of Example 1, wherein displaying, by the modular control tower on a display device, one or more virtual objects indicative of the inter-device communication pairing includes displaying one or more virtual objects indicative of a loss of inter-device communication pairing.

Example 9. An intelligent medical system including a first intelligent medical device, configured to transmit wireless communication data within a surgical environment, a second intelligent medical device, configured to receive the wireless communication data from the first intelligent medical device within the surgical environment, a display device, and a modular control tower in data communication with the first intelligent medical device, the second intelligent medical device, and the display device. The second intelligent medical device may be configured to determine a communication pairing status indicative of an inter-device communication pairing of the second intelligent medical device with the first intelligent medical device based at least in part on the transmitted wireless communication data. The second intelligent medical device may be configured to transmit the communication pairing status to the modular control tower. The modular control tower may be configured to the display device to display an augmented reality display comprising one or more virtual objects indicative of the inter-device communication pairing status.

Example 10. The system of Example 9, in which the first intelligent medical device includes an intelligent stapler, an intelligent RF device, or an intelligent ultrasonic device.

Example 11. The system of Example 9, in which the second intelligent medical device includes an intelligent surgical hub system.

Example 12. The system of Example 9, in which the second intelligent medical device includes an intelligent foot actuation device.

Example 13. The system of Example 9, in which the first intelligent medical device or the second intelligent medical device is further configured to provide an indicator of the inter-device communication pairing status to a user of the first intelligent medical device.

Example 14. The system of Example 13, in which the indicator includes a visual indicator, an auditory indicator, or a haptic indicator.

Example 15. The system of Example 9, in which the wireless communication data includes a preamble or syncword.

Example 16. The system of Example 15, in which the preamble or the syncword includes a first wireless communication stream transmitted at a first carrier frequency and a second wireless communication stream transmitted at a second carrier frequency.

Example 17. The system of Example 16, in which the second intelligent medical device is configured to determine communication pairing status based on a mathematical operation on first preamble data obtained from the first wireless communication stream and second preamble data obtained from the second wireless communication stream.

Example 18. The system of Example 9, in which the one or more virtual objects are indicative of a control of the first intelligent medical device by the second intelligent medical device.

Example 19. The system of Example 9, in which the one or more virtual objects are indicative of a failure of the inter-device communication pairing.

Example 20. The system of Example 19, in which the one or more virtual objects comprise data for a user to correct the failure of the inter-device communication pairing.

Example 21. The system of Example 9, in which the second intelligent medical device is configured to receive instructions from a user of the first intelligent medical device to disable the inter-device communication pairing between the first intelligent medical device and the second intelligent medical device.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of this disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a control circuit, a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

The terms "proximal" and "distal" are used herein with reference to a clinician manipulating the handle portion of the surgical instrument. The term "proximal" refers to the portion closest to the clinician and the term "distal" refers to the portion located away from the clinician. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method of assessing inter-device communication pairing in a surgical setting by a first intelligent medical device, the method comprising:
receiving wireless communication data from a second intelligent medical device;
determining, based on the wireless communication data, communication pairing data indicative of an inter-device communication pairing of the second intelligent medical device with the first intelligent medical device;
computing a communication pairing status associated with the communication pairing data, wherein the communication pairing status is computed based on a mathematical operation associated with the wireless communication data from the second intelligent medical device;

transmitting, to an augmented reality display, a portion of the communication pairing data based on the communication pairing status; and causing the augmented reality display to present, based on the portion of the communication pairing data, a virtual object indicative of the communication pairing status to a user.

2. The method of claim 1, wherein the wireless communication data comprises a syncword.

3. The method of claim 1, further comprising:

receiving as part of the wireless communication data, a first and a second syncword, wherein the first syncword is received via a first wireless communication stream at a first carrier frequency, and wherein the second syncword is received via a second wireless communication stream at a second carrier frequency, and wherein the communication pairing status is further computed based on the first and second syncword.

4. The method of claim 1, further comprising:

determining, based on the communication pairing data and the communication pairing status, that a communication fault in the inter-device communication pairing exists; and causing the augmented reality display to further present, based on the portion of the communication pairing data, a second virtual object indicating the communication fault in the inter-device communication pairing to the user.

5. The method of claim 4, further comprising:

determining data to resolve the communication fault in the inter-device communication pairing; and causing the augmented reality display to further present, based on the portion of the communication pairing data, a third virtual object comprising the data to resolve the communication fault in the inter-device communication pairing to the user.

6. The method of claim 1, wherein the mathematical operation comprises at least one of a convolution function, a cross-correlation function, or an autocorrelation function.

7. The method of claim 1, further comprising:

receiving a user input, wherein the user input comprises a request to pair the second intelligent medical device with the first intelligent medical device, and wherein the communication pairing data is determined in response to receiving the user input.

8. The method of claim 1, further comprising:

receiving a user input comprising an instruction to disable the inter-device communication pairing between the first intelligent medical device and the second intelligent medical device; and in response to receiving the instruction, causing the augmented reality display to further present a second virtual object indicating a loss of the inter-device communication pairing to the user.

9. An intelligent medical system comprising:

an augmented reality display in communication with a first intelligent medical device;

a second intelligent medical device configured to transmit wireless communication data to the first intelligent medical device; and the first intelligent medical device comprising a processor configured to:

receive the wireless communication data from the second intelligent medical device;

determine, based on the wireless communication data, communication pairing data indicative of an inter-device communication pairing of the second intelligent medical device with the first intelligent medical device;

compute a communication pairing status associated with the communication pairing data, wherein the communication pairing status is computed based on a mathematical operational associated with the wireless communication data from the second intelligent medical device;

transmit, to the augmented reality display, a portion of the communication pairing data based on the communication pairing status; and cause the augmented reality display to present, based on the portion of the communication pairing data, a virtual object indicative of the communication pairing status to a user.

10. The system of claim 9, wherein the first intelligent medical device or the second intelligent medical device comprises an intelligent stapler, an intelligent RF device, or an intelligent ultrasonic device.

11. The system of claim 9, wherein an intelligent surgical hub system comprises the first intelligent medical device and the augmented reality display.

12. The system of claim 9, wherein the processor is further configured to receive a user input, wherein the user input comprises a request to pair the second intelligent medical device with the first intelligent medical device, and wherein the communication pairing data is determined in response to receiving the user input.

13. The system of claim 9, wherein the first intelligent medical device further comprises an indicator configured to provide an indication of the communication pairing status to the user.

14. The system of claim 13, wherein the indicator is at least one of a visual indicator, an auditory indicator, or a haptic indicator.

15. The system of claim 9, wherein the wireless communication data comprises a syncword.

16. The system of claim 15, wherein the syncword comprises a first syncword and a second syncword, and wherein the processor is further configured to:

receive as part of the wireless communication data, a first wireless communication stream transmitted at a first carrier frequency, wherein the first wireless communication stream comprises the first syncword; and receive as part of the wireless communication data, a second wireless communication stream transmitted at a second carrier frequency, wherein the second wireless communication stream comprises the second syncword.

17. The system of claim 9, wherein the mathematical operation comprises at least one of a convolution function, a cross-correlation function, or an autocorrelation function.

18. The system of claim 9, wherein the processor is further configured to:

determine, based on the communication pairing status and the communication pairing data, that a communication fault in the inter-device communication pairing exists; and cause the augmented reality display to further present, based on the portion of the communication pairing data, a second virtual object indicating the communication fault in the inter-device communication pairing to the user.

19. The system of claim 18, wherein the processor is further configured to:

determine data to resolve the communication fault in the inter-device communication pairing; and cause the augmented reality display to further present, based on the portion of the communication pairing data, a third virtual object comprising the data to resolve the communication fault in the inter-device communication pairing to the user.

20. The system of claim 18, wherein the processor is further configured to:

cause the augmented reality display to further present, based on the portion of the communication pairing data, a third virtual object indicating a loss of the inter-device communication pairing to the user.

21. The system of claim 9, wherein the processor is further configured to:

receive a user input comprising an instruction to disable the inter-device communication pairing between the first intelligent medical device and the second intelligent medical device; and in response to receiving the instruction, cause the augmented reality display to further present a second virtual object indicating a loss of the inter-device communication pairing to the user.

* * * * *